(12) United States Patent
Mihai et al.

(10) Patent No.: US 10,985,659 B2
(45) Date of Patent: Apr. 20, 2021

(54) FLEXIBLE POWER CONVERSION SYSTEMS WITH WIDE DC VOLTAGE UTILIZATION

(71) Applicants: Rasvan Catalin Mihai, Vancouver (CA); Helmine Serban, New Westminster (CA)

(72) Inventors: Rasvan Catalin Mihai, Vancouver (CA); Helmine Serban, New Westminster (CA)

( * ) Notice: Subject to any disclaimer, the term of this patent is extended or adjusted under 35 U.S.C. 154(b) by 0 days.

(21) Appl. No.: 16/680,520

(22) Filed: Nov. 12, 2019

(65) Prior Publication Data
US 2020/0153336 A1    May 14, 2020

Related U.S. Application Data

(60) Provisional application No. 62/767,391, filed on Nov. 14, 2018.

(51) Int. Cl.
| | | |
|---|---|---|
| *H02M 3/158* | (2006.01) | |
| *H02J 3/38* | (2006.01) | |
| *H02J 7/35* | (2006.01) | |

(52) U.S. Cl.
CPC ............. *H02M 3/158* (2013.01); *H02J 3/381* (2013.01); *H02J 7/35* (2013.01); *H02J 2300/26* (2020.01);
(Continued)

(58) Field of Classification Search
CPC ...... H02J 3/38; H02J 3/381; H02J 7/35; H02J 2300/28; H02J 2300/26; H02J 2300/30; H02M 3/158
See application file for complete search history.

(56) References Cited

U.S. PATENT DOCUMENTS

| | | |
|---|---|---|
| 6,349,044 B1 | 2/2002 | Canales-Abarca et al. |
| 6,353,547 B1 | 3/2002 | Jang et al. |
| 9,450,491 B2 | 9/2016 | Zhang et al. |

OTHER PUBLICATIONS

E. Serban, M. Ordonez, and C. Pondiche, "DC-bus voltage range extension in 1500 V photovoltaic inverters," IEEE J. Emerg. Sel. Topics Power Electron., vol. 3, No. 4, pp. 901-917, Dec. 2015.
(Continued)

*Primary Examiner* — Robert L Deberadinis
(74) *Attorney, Agent, or Firm* — Todd A. Rattray; Oyen Wiggs Green & Mutala LLP

(57) ABSTRACT

A DC-DC power converter comprises: first, second and third input nodes for connection to one or more DC input power sources; a pair of upper switches $T_{H1}$, $T_{H2}$ connected in series between the first and second input nodes; and a pair of lower switches $T_{L1}$, $T_{L2}$ connected in series between the second and third input nodes. An output port is connected, via one or more output capacitors and one or more output inductors, to an upper switching node between the pair of upper switches and a lower switching node between the pair of lower switches $T_{L1}$, $T_{L2}$. The converter is connectable to a pair of DC input power sources, with a first DC input power source connected between the first and second input nodes and a second DC input power source connected between the second and third input nodes, and, when so connected, the pair of upper switches $T_{H1}$, $T_{H2}$ and the pair of lower switches $T_{L1}$, $T_{L2}$ are switchable to provide DC output power at the output por. The converter is connectable to one DC input power source connected between the first and third input nodes, and, when so connected, the pair of upper switches $T_{H1}$, $T_{H2}$ and the pair of lower switches $T_{L1}$, $T_{L2}$ are switchable to provide DC output power at the output port.

25 Claims, 15 Drawing Sheets

Traditional Solar Converters      Figure 1B Solar Converter Architecture

(52) U.S. Cl.
CPC ....... *H02J 2300/28* (2020.01); *H02J 2300/30* (2020.01)

(56) References Cited

OTHER PUBLICATIONS

E. Serban, F. Paz and M. Ordonez, "PV array voltage range extension for photovoltaic inverters using a mini-boost," 2016 IEEE Energy Conversion Congress and Exposition (ECCE), Milwaukee, WI, 2016, pp. 1-8.

E. Serban, F. Paz and M. Ordonez, "Improved PV Inverter Operating Range Using a Miniboost," in IEEE Transactions on Power Electronics, vol. 32, No. 11, pp. 8470-8485, Nov. 2017.

C. N. M. Ho, H. Breuninger, S. Pettersson, G. Escobar, L. A. Serpa and A. Coccia, "Practical Design and Implementation Procedure of an Interleaved Boost Converter Using SiC Diodes for PV Applications," in IEEE Transactions on Power Electronics, vol. 27, No. 6, pp. 2835-2845, Jun. 2012.

J. M. Kwon, B. H. Kwon and K. H. Nam, "Three-Phase Photovoltaic System With Three-Level Boosting MPPT Control," in IEEE Transactions on Power Electronics, vol. 23, No. 5, pp. 2319-2327, Sep. 2008.

E. Serban, M. Ordonez, C. Pondiche, K. Feng, M. Anun and P. Servati, "Power management control strategy in photovoltaic and energy storage for off-grid power systems," 2016 IEEE 7th International Symposium on Power Electronics for Distributed Generation Systems (PEDG), Vancouver, BC, 2016, pp. 1-8.

Y. Darroman and A. Ferre, "42-V/3-V Watkins-Johnson converter for automotive use," IEEE Trans. Power Electron., vol. 21, No. 3, pp. 592-602, May 2006.

R. C. N. Pilawa-Podgurski and D. J. Perreault, "Submodule Integrated Distributed Maximum Power Point Tracking for Solar Photovoltaic Applications," in IEEE Transactions on Power Electronics, vol. 28, No. 6, pp. 2957-2967, Jun. 2013.

A. Urtasun and D. D. C. Lu, "Control of a Single-Switch Two-Input Buck Converter for MPPT of Two PV Strings," in IEEE Transactions on Industrial Electronics, vol. 62, No. 11, pp. 7051-7060, Nov. 2015.

C. Carstensen and J. Biela, "A Three-Level Buck Converter With a Wide Voltage Operation Range for Hardware-in-the-Loop Test Systems," in IEEE Transactions on Power Electronics, vol. 31, No. 9, pp. 6176-6191, Sep. 2016.

X. Liu, P. K. T. Mok, J. Jiang and W. H. Ki, "Analysis and Design Considerations of Integrated 3-Level Buck Converters," in IEEE Transactions on Circuits and Systems I: Regular Papers, vol. 63, No. 5, pp. 671-682, May 2016.

X. Ruan, B. Li, Q. Chen, S. C. Tan and C. K. Tse, "Fundamental Considerations of Three-Level DC-DC Converters: Topologies, Analyses, and Control," in IEEE Transactions on Circuits and Systems I: Regular Papers, vol. 55, No. 11, pp. 3733-3743, Dec. 2008.

M. Ilic, B. Hesterman, and D. Maksimovic, "Interleaved zero current transition three-level buck converter," in Proc. 21st Annu. IEEE Appl. Power Electron. Conf. Expo., 2006, pp. 72-78.

R. M. Cuzner, A. R. Bendre, P. J. Faill, and B. Semenov, "Implementation of a non-isolated three level DC/DC converter suitable for high power systems," in Proc. 42nd IAS Annu. Meeting Conf. Record IEEE Ind. Appl. Conf., New Orleans, LA, USA, 2007, pp. 2001-2008.

S. Lu, M. Mu, Y. Jiao, F. C. Lee and Z. Zhao, "Coupled Inductors in Interleaved Multiphase Three-Level DC-DC Converter for High-Power Applications," in IEEE Transactions on Power Electronics, vol. 31, No. 1, pp. 120-134, Jan. 2016.

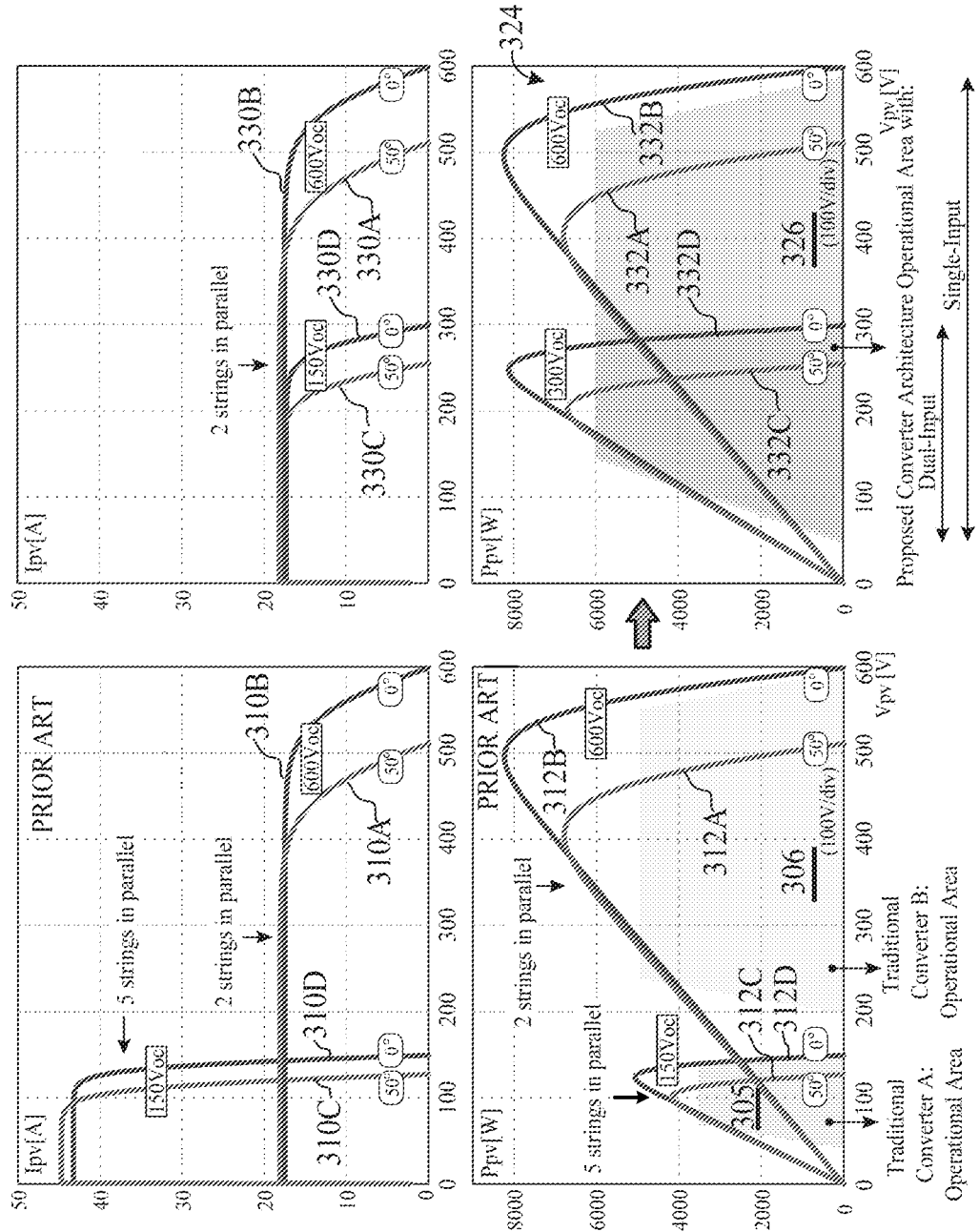

FLEXIBLE POWER CONVERSION SYSTEMS WITH WIDE DC VOLTAGE UTILIZATION

CROSS-REFERENCE TO RELATED APPLICATIONS

This application claims the benefit under 35 U.S.C. § 119 of U.S. Patent Application No. 62/767,391 filed 14 Nov. 2018 and entitled FLEXIBLE POWER CONVERSION SYSTEMS WITH WIDE DC VOLTAGE UTILIZATION which is hereby incorporated herein by reference for all purposes.

TECHNICAL FIELD

The technology in this disclosure relates to DC-DC power conversion. Specific embodiments provide systems and methods for DC-DC power conversion which provide wide DC voltage utilization and correspondingly high power production.

BACKGROUND

Electrical power inverters (DC-AC) and converters (DC-DC) convert electrical power from one (input) format and provide output power in a second format. Often, the output power format has desired characteristics (sometimes referred to as set points) for a target load. For example, the output power could be AC power with electrical characteristics (e.g. voltage and current set points) suitable for contributing the power to the grid. As another example, the output power could be DC power with electrical characteristics (e.g. voltage and current set points) suitable for charging electrical energy storage (EES) systems (e.g. Lithium-ion battery based EES systems or the like). Such voltage and current set points may vary depending on the state of charge of the corresponding EES system.

For some applications, such as, by way of non-limiting example, energy harvesting from variable energy sources like photovoltaic (PV) cells, wind turbines, electric machines fuel cells and/or the like, the characteristics of the input power provided to the inverter or converter can vary significantly. A characteristic of electrical power inverters and converters, which may be referred to as the voltage utilization ratio, is the ratio of the maximum suitable DC input voltage ($V_{maxDC}$) to the minimum suitable DC input voltage ($V_{minDC}$) while maintaining power conversion with acceptable electrical characteristics. The voltage utilization ratio is a characteristic which describes the ability of the power conversion system to accommodate variability of the input voltage. For typical prior art DC-AC inverters, typical voltage utilization ratios are on the order of 2:1. For typical prior art DC-DC buck converters, typical voltage utilization ratios are on the order of 3:1. There is a general desire to provide DC-DC power conversion with wide voltage utilization ratios.

Many DC-DC power converters employ maximum power point tracking (MPPT) algorithms, which control the operation of their corresponding systems to operate at maximum possible efficiency and to generate as much suitable output power as possible even under variable environmental conditions. However, in typical applications, the efficacy of the MPPT algorithm is limited by the DC voltage input range of the power converter system (which may be referred to as the voltage utilization range). A wider voltage utilization range has been shown to translate into increased power production—see, for example, E. Serban, F. Paz and M. Ordonez, "Improved PV Inverter Operating Range Using a Mini-boost," in *IEEE Transactions on Power Electronics,* vol. 32, no. 11, pp. 8470-8485, November 2017, which is hereby incorporated herein by reference.

Another issue associated with energy harvesting from pluralities of variable energy sources connected in parallel relates to variability of the individual sources. For example, in a parallel connected PV array, one or more PV arrays may be in the sun and one or more PV arrays may be in the shade and, consequently, these PV arrays may generate relatively widely varying electrical characteristics. There is a desire to provide DC-DC energy converters with relatively wide voltage utilization ranges (at their inputs) to accommodate this type of output fluctuation in parallel-connected variable energy sources.

In prior art power conversion systems, at power start-up, in-rush current transients may occur between the input power source and various components (e.g. DC switches, capacitors and/or the like) of the power conversion system. Such in-rush current transients can degrade the performance and lifetime of the power conversion system components. There is a general desire to mitigate the effect of these in-rush current transients on start-up.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a DC-DC power converter comprising: first, second and third input nodes for connection to one or more DC input power sources; a pair of upper switches TH1, TH2 connected in series between the first and second input nodes; and a pair of lower switches TL1, TL2 connected in series between the second and third input nodes. An output port is connected, via one or more output capacitors and one or more output inductors, to an upper switching node between the pair of upper switches TH1, TH2 and a lower switching node between the pair of lower switches TL1, TL2. The converter is connectable to a pair of DC input power sources, with a first DC input power source connected between the first and second input nodes and a second DC input power source connected between the second and third input nodes, and, when so connected, the pair of upper switches TH1, TH2 and the pair of lower switches TL1, TL2 are switchable to provide DC output power at the output port. The converter is connectable to one DC input power source connected between the first and third input nodes, and, when so connected, the pair of upper switches TH1, TH2 and the pair of lower switches TL1, TL2 are switchable to provide DC output power at the output port.

The DC-DC power converter may comprise an upper input capacitor $C_H$ connected in parallel with the pair of upper switches $T_{H1}$, $T_{H2}$ between the first and second input nodes and a lower input capacitor $C_L$ connected in parallel with the pair of lower switches $T_{L1}$, $T_{L2}$ between and second and third input nodes.

The output port may comprise an upper output node and a lower output node. The one or more output inductors may comprise a winding-coupled inductor which provides inductance in series between the upper switching node and the upper output node and in series between the lower switching node and the lower output node. The one or more output capacitors may comprise an output capacitor $C_b$ connected between the upper and lower output nodes.

The output port may be connectable to a load comprising an electrical energy storage (EES) system to thereby provide the DC output power to the electrical energy storage system.

The electrical energy storage system may have a voltage set point $V_b^*$ suitable for providing electrical energy to the energy storage system and the DC-DC converter may be connectable to the pair of DC input power sources to provide DC output power having an output voltage at the voltage set point $V_b^*$ at the output port under the condition that $V_{dc1}+V_{dc2} \geq V_b^*$, where $V_{dc1}$ is the voltage of the first DC input power source and $V_{dc2}$ is the voltage of the second DC input power source.

The first and second DC input power sources may be independent of one another.

The electrical energy storage system may have a voltage set point $V_b^*$ suitable for providing electrical energy to the energy storage system and the DC-DC converter may be connectable to the one DC input power source to provide DC output power having an output voltage at the voltage set point $V_b^*$ at the output port under the condition that $V_{dc} \geq V_b^*$, where $V_{dc}$ is the voltage of the one DC input power source.

The first and second DC input power sources may comprise variable power sources having power that varies over time. The first and second DC input power sources may each comprise one or more photovoltaic cells. The first and second DC input power sources may each comprise one or more wind turbines or fuel cells.

The DC-DC power converter may comprise a controller configured to switch the pair of upper switches $T_{H1}, T_{H2}$ and the pair of lower switches $T_{L1}, T_{L2}$ according to a pulse-width modulation scheme wherein: the upper pair of switches $T_{H1}, T_{H2}$ have an upper duty cycle $d_H$ that is a period of time $(t_{onH})$ during which the upper switch $T_{H1}$ is conducting during a switching period $T_s$ and the upper switch $T_{H2}$ is conducting whenever the upper switch $T_{H1}$ is not conducting; and the lower pair of switches $T_{L1}, T_{L2}$ have a lower duty cycle $d_L$ that is a period of time $(t_{onL})$ during which the lower switch $T_{L1}$ is conducting during a switching period $T_s$ and the lower switch $T_{L2}$ is conducting whenever the lower switch $T_{L1}$ is not conducting.

The electrical energy storage system may have an output voltage set point $V_b^*$ suitable for providing electrical energy to the energy storage system and the DC-DC converter may be connectable to the pair of DC input power sources to provide DC output power having an output voltage at the output voltage set point $V_b^*$ at the output port under the condition that $V_{dc1}+V_{dc2} \geq V_b^*$, where $V_{dc1}$ is the voltage of the first DC input power source and $V_{dc2}$ is the voltage of the second DC input power source; and the controller may be configured to switch the pair of upper switches $T_{H1}, T_{H2}$ and the pair of lower switches $T_{L1}, T_{L2}$ with upper and lower duty cycles $d_H, d_L$ that satisfy the relation $$d_H + d_L \cong \frac{V_b^*}{V_{dc1}+V_{dc2}}.$$

The DC-DC power converter may comprise a controller configured to switch the pair of upper switches $T_{H1}, T_{H2}$ and the pair of lower switches $T_{L1}, T_{L2}$ according to a pulse-width modulation scheme wherein: the upper pair of switches $T_{H1}, T_{H2}$ have an upper duty cycle $d_H$ that is a period of time $(t_{onH})$ during which the upper switch $T_{H1}$ is conducting during a switching period $T_s$ and the upper switch $T_{H2}$ is conducting whenever the upper switch $T_{H1}$ is not conducting; and the lower pair of switches $T_{L1}, T_{L2}$ have a lower duty cycle $d_L$ that is a period of time $(t_{onL})$ during which the lower switch $T_{L1}$ is conducting during a switching period $T_s$ and the lower switch $T_{L2}$ is conducting whenever the lower switch $T_{L1}$ is not conducting; with a common duty cycle $d_{HL}$, wherein $$d_H = d_L = \frac{d_{HL}}{2}.$$

For $d_{HL}<50\%$, $d_{HL}$ is a period of time during which the pair of upper switches $T_{H1}, T_{H2}$ is conducting during a switching period $T_s$ and the pair of lower switches $T_{L1}, T_{L2}$ is conducting whenever the pair of upper switches $T_{H1}, T_{H2}$ is not conducting; and for $d_{HL}>50\%$, $d_{HL}$ is a period of time during which the pair of upper switches $T_{H1}, T_{H2}$ is conducting during a switching period $T_s$ and the pair of lower switches $T_{L1}, T_{L2}$ and upper switches $T_{H1}, T_{H2}$ may simultaneously conduct.

The electrical energy storage system may have an output voltage set point $V_b^*$ suitable for providing electrical energy to the energy storage system and wherein the DC-DC converter is connectable to the one DC input power source to provide DC output power having an output voltage at the output voltage set point $V_b^*$ at the output port under the condition that $V_{dc} \geq V_b^*$, where $V_{dc}$ is the voltage of the one DC input power source. The controller may be configured to switch the pair of upper switches $T_{H1}, T_{H2}$ and the pair of lower switches $T_{L1}, T_{L2}$ to satisfy the relation $$\begin{cases} d_{HL} = d_H + d_L \\ V_b^* = d_H V_H + d_L V_L \end{cases}.$$

The DC-DC power converter may have an input voltage between the first and third input nodes that sums to be within a range of 30V-600V DC. The DC-DC power converter may have an input voltage between the first and third input nodes that sums to be within a range of 100V-1500V DC.

The DC-DC power converter may comprise: an upper input switch $K_{dc1}$ connected in series between the first input node and the pair of upper switches $T_{H1}, T_{H2}$ and a lower input switch $K_{dc2}$ connected in series between the third input node and the pair of lower switches $T_{L1}, T_{L2}$; an upper input capacitor $C_H$ connected in parallel with the pair of upper switches $T_{H1}, T_{H2}$ between the first and second input nodes and a lower input capacitor $C_L$ connected in parallel with the pair of lower switches $T_{L1}, T_{L2}$ between and second and third input nodes; and a controller connected to control the switching states of the upper input switch $K_{dc1}$ and the lower input switch $K_{dc2}$.

The output port may be connectable to a load comprising an electrical energy storage (EES) system to thereby provide the DC output power to the electrical energy storage system and the controller may be configured to operate the DC-DC power converter in a pre-charge boost mode by: controlling the switching states of the upper input switch $K_{dc1}$ and the lower input switch $K_{dc2}$ to be non-conducting; and controlling the switch pairs $T_{H1}$, $T_{H2}$ and $T_{L1}$, $T_{L2}$ in a pre-charge boost mode wherein: the electrical energy storage system pre-charges the upper input capacitor $C_H$ to an upper voltage level $v_H$ that is within a threshold region around a voltage level $V_{dc1}$ of a first DC input power source connectable between the first and second input nodes; and the electrical energy storage system pre-charges the lower input capacitor $C_L$ to a lower voltage level $v_L$ that is within a threshold region around a voltage $V_{dc2}$ of a second DC input power source connectable between the second and third input nodes.

The upper voltage level $v_H$ and the lower voltage level $v_L$ may be independent from and different than one another.

The controller may be configured to determine that the output voltage set point $V_b^*$ cannot be attained and switch to an input power regulation control mode to achieve maximum power production at a particular electrical energy storage (EES) system connected to the output port. According to the input power regulation control mode, the controller may regulate the input voltages $V_{dc1}$ and $V_{dc2}$ to $V_{dc1}=v_H \approx v_{mppH}^*$ and $V_{dc2}=v_L \approx v_{mppL}^*$, where $v_{mppH}^*$, $v_{mppL}^*$ are reference voltages determined by a MPPT algorithm to maximize energy harvesting for the particular electrical energy storage (EES) system.

The controller may be configured to determine that the output voltage set point $V_b^*$ cannot be attained and switches to an input power regulation control mode to achieve maximum power production at a particular electrical energy storage (EES) system connected to the output port. According to the input power regulation control mode, the controller may regulate the input voltage $V_{dc}$ to $V_{dc}=v_{H+}v_L \approx v_{mpp}^*$, where $v_H=v_L$ and $v_{mpp}^*$ is a reference voltage determined by a MPPT algorithm to maximize energy harvesting for the particular electrical energy storage (EES) system.

Another aspect of the invention provides a DC-DC power converter system comprising: first, second and third input nodes for connection to one or more DC input power sources; a pair of upper switches $T_{H1}$, $T_{H2}$ connected in series between the first and second input nodes; a pair of lower switches $T_{L1}$, $T_{L2}$ connected in series between the second and third input nodes. An output port is connected, via one or more output capacitors and one or more output inductors, to an upper switching node between the pair of upper switches $T_{H1}$, $T_{H2}$ and a lower switching node between the pair of lower switches $T_{L1}$, $T_{L2}$. A pair of DC input power sources, with a first DC input power source connected between the first and second input nodes and a second DC input power source connected between the second and third input nodes, the pair of upper switches $T_{H1}$, $T_{H2}$ and the pair of lower switches $T_{L1}$, $T_{L2}$ switchable to provide DC output power at the output port. The output port is connected to a load comprising an electrical energy storage (EES) system to thereby provide the DC output power to the electrical energy storage system.

The electrical energy storage system may have a voltage set point $V_b^*$ suitable for providing electrical energy to the energy storage system and wherein the DC output power at the output port has an output voltage at the voltage set point $V_b^*$ under the condition that $V_{dc1}+V_{dc2} \geq V_b^*$, where $V_{dc1}$ is the voltage of the first DC input power source and $V_{dc2}$ is the voltage of the second DC input power source.

Another aspect of the invention provides a method for DC-DC power conversion over a wide input voltage utilization range. The method comprises: providing a DC-DC power conversion circuit, the DC-DC power conversion circuit comprising: first, second and third input nodes for connection to one or more DC input power sources; a pair of upper switches $T_{H1}$, $T_{H2}$ connected in series between the first and second input nodes; a pair of lower switches $T_{L1}$, $T_{L2}$ connected in series between the second and third input nodes; and an output port connected, via one or more output capacitors and one or more output inductors, to an upper switching node between the pair of upper switches $T_{H1}$, $T_{H2}$ and a lower switching node between the pair of lower switches $T_{L1}$, $T_{L2}$. The method comprises: connecting the DC-DC power conversion circuit to a pair of DC input power sources, with a first DC input power source connected between the first and second input nodes and a second DC input power source connected between the second and third input nodes; connecting the output port to a load comprising an electrical energy storage (EES) system; and switching the pair of upper switches $T_{H1}$, $T_{H2}$ and the pair of lower switches $T_{L1}$, $T_{L2}$ to provide DC output power to the electrical energy storage system. The electrical energy storage system has a voltage set point $V_b^*$ suitable for providing electrical energy to the energy storage system and wherein switching the pair of upper switches $T_{H1}$, $T_{H2}$ and the pair of lower switches $T_{L1}$, $T_{L2}$ to provide DC output power to the electrical energy storage system comprises providing the DC output power having an output voltage at the voltage set point $V_b^*$ at the output port under the condition that $V_{dc1}+V_{dc2} \geq V_b^*$, where $V_{dc1}$ is the voltage of the first DC input power source and $V_{dc2}$ is the voltage of the second DC input power source.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 2A shows plots of current-voltage (I-V) and power-voltage (P-V) and operational power conversion area for a prior art DC-DC converter for 2 parallel-connected PV arrays and for 5 parallel-connected PV arrays at 50° C. and 0° C.

FIG. 2B shows plots of current-voltage (I-V) and power-voltage (P-V) and operational power conversion area for a DC-DC converter according to the FIG. 1B embodiment showing a first configuration comprising a pair of independent PV array inputs (each having an open circuit voltage of 300 Voc) at 50° C. and 0° C. and a second configuration comprising a single PV array input with 600 Voc at 50° C. and 0° C.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provide a DC-DC power converter comprising: first, second and third input nodes for connection to one or more DC input power sources; a pair of upper switches TH1, TH2 connected in series between the first and second input nodes; and a pair of lower switches TL1, TL2 connected in series between the second and third input nodes. An output port is connected, via one or more output capacitors and one or more output inductors, to an upper switching node between the pair of upper switches TH1, TH2 and a lower switching node between the pair of lower switches TL1, TL2. The converter is connectable to a pair of DC input power sources, with a first DC input power source connected between the first and second input nodes and a second DC input power source connected between the second and third input nodes, and, when so connected, the pair of upper switches TH1, TH2 and the pair of lower switches TL1, TL2 are switchable to provide DC output power at the output port. The converter is connectable to one DC input power source connected between the first and third input nodes, and, when so connected, the pair of upper switches TH1, TH2 and the pair of lower switches TL1, TL2 are switchable to provide DC output power at the output port.

Figure 1A:
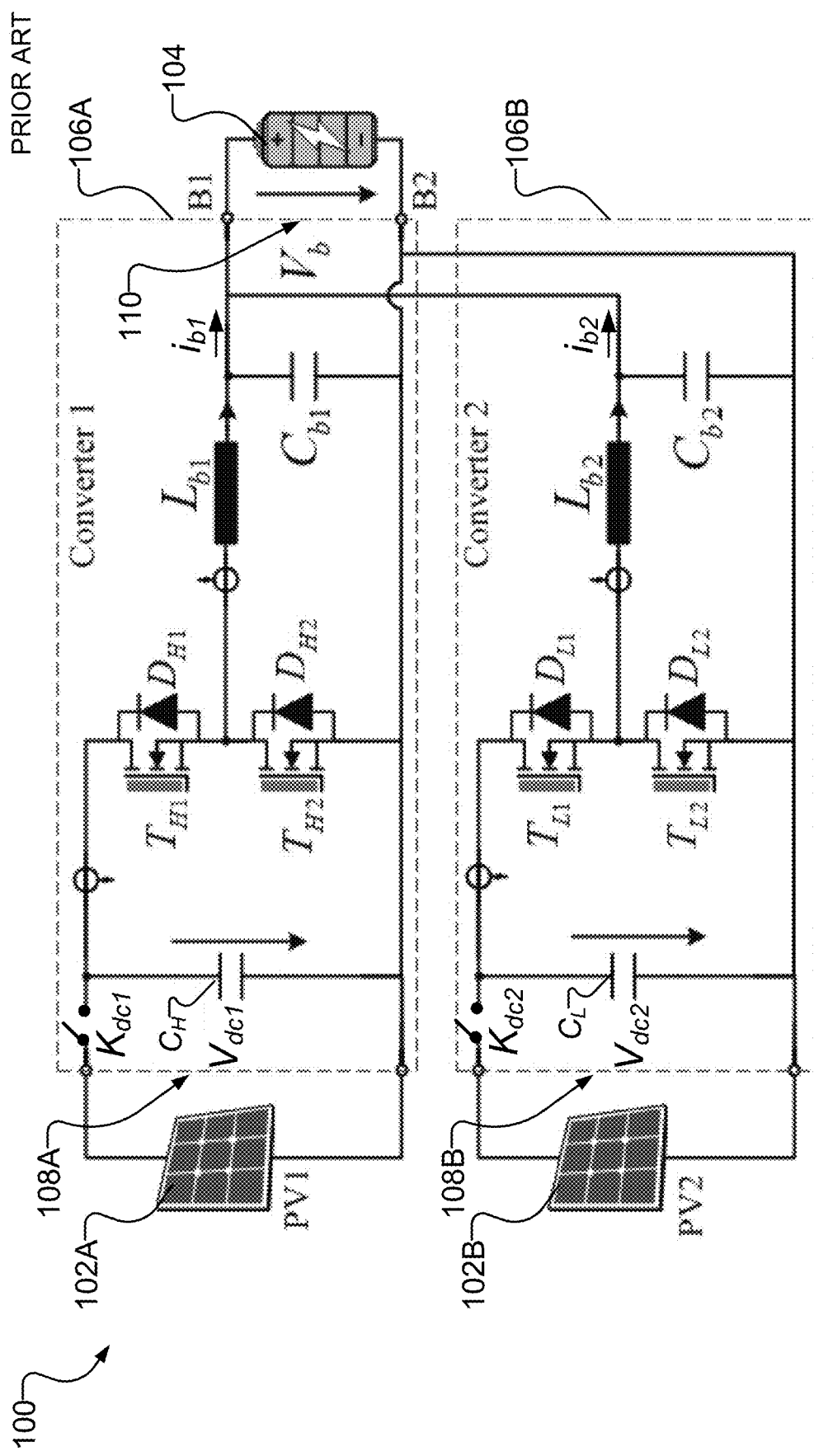
FIG. 1A is a schematic circuit diagram of a typical prior art DC-DC converter topology with a pair of PV arrays connected in parallel to a EES system.

FIG. 1A shows a schematic prior art PV system 100 comprising a pair of PV arrays 102A (PV1), 102B (PV2) (collectively, PV arrays 102), each of which are connected in parallel to EES 104 by respective DC-DC converters 106A, 106B (collectively, DC-DC converters 106). Each of DC-DC converters 106 comprises a corresponding input port 108A, 108B (collectively input ports 108) which are connected to their respective input PV arrays 102A, 102B Each of DC-DC converters 106 is connected in parallel to a single output port 110 (defined by nodes B1, B2) which is connected to EES 104. In this manner, each of DC-DC converters 106 transfers power from its corresponding PV array 102 via a single output port 110 to EES 104. Each of DC-DC converters 106 comprises the same components. Specifically, DC-DC converter 106A comprises: an input capacitor $C_H$, a pair of transistor switches $T_{H1}$, $T_{H2}$ (shown as MOSFETs in the illustrated embodiment, although other types of transistor-based switches could be used); a corresponding pair of diodes $D_{H1}$, $D_{H2}$, an inductor $L_{b1}$ and a smoothing capacitor $C_{b1}$. Similarly, DC-DC converter 106B comprises: an input capacitor $C_L$, a pair of transistor switches $T_{L1}$, $T_{L2}$ (shown as MOSFETs in the illustrated embodiment, although other types of transistor-based switches could be used); a corresponding pair of diodes $D_{L1}$, $D_{L2}$, an inductor $L_{b2}$ and a smoothing capacitor $C_{b2}$.

For DC-DC converter 106A, when switch $T_{H1}$ is conducting and switch $T_{H2}$ is not conducting, diode $D_{H2}$ is reverse biased and current flows through switch $T_{H1}$, and inductor $L_{b1}$ to charge capacitor $C_{b1}$ and to provide output voltage $V_b$ at, and current $i_{b1}$ to, EES 104 via output port 110 (nodes B1, B2). When switch $T_{H2}$ is conducting and switch $T_{H1}$ is not conducting, current is maintained through inductor $L_{b1}$ via switch $T_{H2}$ and/or diode $D_{H2}$ (which becomes forward biased) and capacitor $C_{b1}$ maintains the output voltage $V_b$ at, and current $i_{b1}$ to, EES 104 via output port 110. DC-DC converter 106B works in a similar manner to provide output voltage $V_b$ at, and current $i_{b2}$ to EES 104.

In the FIG. 1A configuration, DC-DC converter 106A receives input voltage $V_{dc1}$ from PV array 102A and DC-DC converter 106B receives input voltage $V_{dc2}$ from PV array 102B. Because of the parallel configuration of the FIG. 1A DC-DC converters 106, if the input voltage $V_{dc1}$, $V_{dc2}$ received by either of converters 106A, 106B drops below $V_b$, then that converter will not contribute to charging EES 104 via output port 110. That is, both DC-DC converters 106A, 106B can only supply power to EES 104 via output port 110 when both input PV arrays 102A, 102B are generating voltages $V_{dc1}$, $V_{dc2}$ that are greater than $V_b$—i.e. under the condition that:

$$\begin{cases} V_{dc1} \geq V_b \\ V_{dc2} \geq V_b \end{cases} \text{and} \tag{1}$$

Figure 1B:
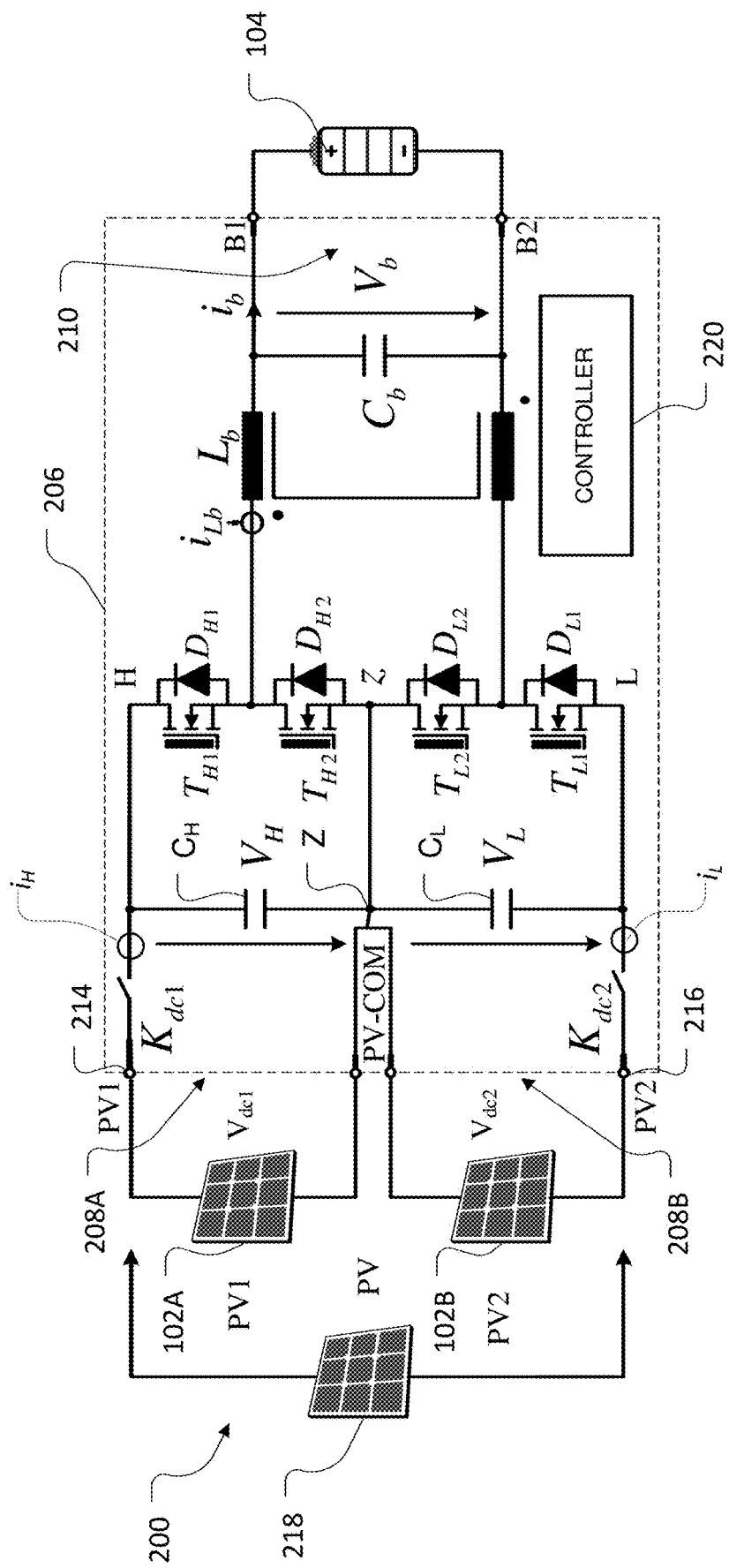
FIG. 1B is a schematic circuit diagram of a DC-DC converter having wide DC voltage utilization according to a particular embodiment.

FIG. 1B shows a schematic depiction of a PV system 200 comprising a DC-DC converter 206 according to a particular embodiment of the invention. Like prior art PV system 100 described above, PV system 200 of the FIG. 1B embodiment comprises a pair of PV arrays 102A (PV1), 102B (PV2) (collectively, PV arrays 102). Each of PV arrays 102 may comprise one or a plurality of series connected PV cells or PV arrays. PV arrays 102A, 120B could be different (e.g. could comprise different numbers of PV cells or PV arrays, or EES, electric machines). In other embodiments, different numbers of PV arrays 102 could be connected to DC-DC converter 206 and/or DC-DC converter 206 could be suitably modified to accommodate different numbers (e.g. more than two) of PV arrays 102. DC-DC converter 206 of the FIG. 1B embodiment comprises a pair of input ports 208A, 208B (collectively, input ports 208) which, in the illustrated embodiment, are connected to respective PV arrays 102A, 102B. Unlike the prior art topology shown in FIG. 1A, input ports 208 of DC-DC converter 200 share a common node Z. Specifically, PV array 102A is connected to DC-DC converter 206 between node 214 and common node Z and PV array 102B is connected to DC-DC converter 206 between common node Z and node 216. Input nodes 214, 216 may optionally comprise electronically controllable DC switches $K_{dc1}$, $K_{dc2}$ for cutting off current from PV arrays 102. DC-DC converter 206 of the illustrated embodiment is shown connected via an output port 210 to an EES 104. In this manner, DC-DC converter 206 transfers power from both of PV arrays 102A, 102B to EES 104.

Converter 206 comprises a pair of series input capacitors, $C_H$, $C_L$ respectively connected between input node 214 and common input node Z and between common input node Z and input node 216, and a bi-directional three-level converter comprising: a first pair of transistor switches $T_{H1}$, $T_{H2}$ (shown as MOSFETs in the illustrated embodiment, although other types of transistor-based switches could be used) connected in parallel to input capacitor $C_H$ and a corresponding first pair of diodes $D_{H1}$, $D_{H2}$; a second pair of transistor switches $T_{L1}$, $T_{L2}$ connected in parallel to input capacitor $C_L$ and a corresponding second pair of diodes $D_{L1}$, $D_{L2}$; an integrated winding-coupled inductor $L_b$; and an output capacitor $C_b$. Unlike the prior art circuit of FIG. 1A, which includes a pair of inductors $L_{b1}$, $L_{b2}$, each designed to accommodate a particular ripple current and a particular magnetic core, the integrated winding-coupled inductor $L_b$ of DC-DC converter 206 comprises a single inductor component which provides coupled inductance, so that the ripple current and magnetic core size may be reduced relative to the pair of inductors $L_{b1}$, $L_{b2}$ in the circuit of FIG. 1A.

Figure 1C:
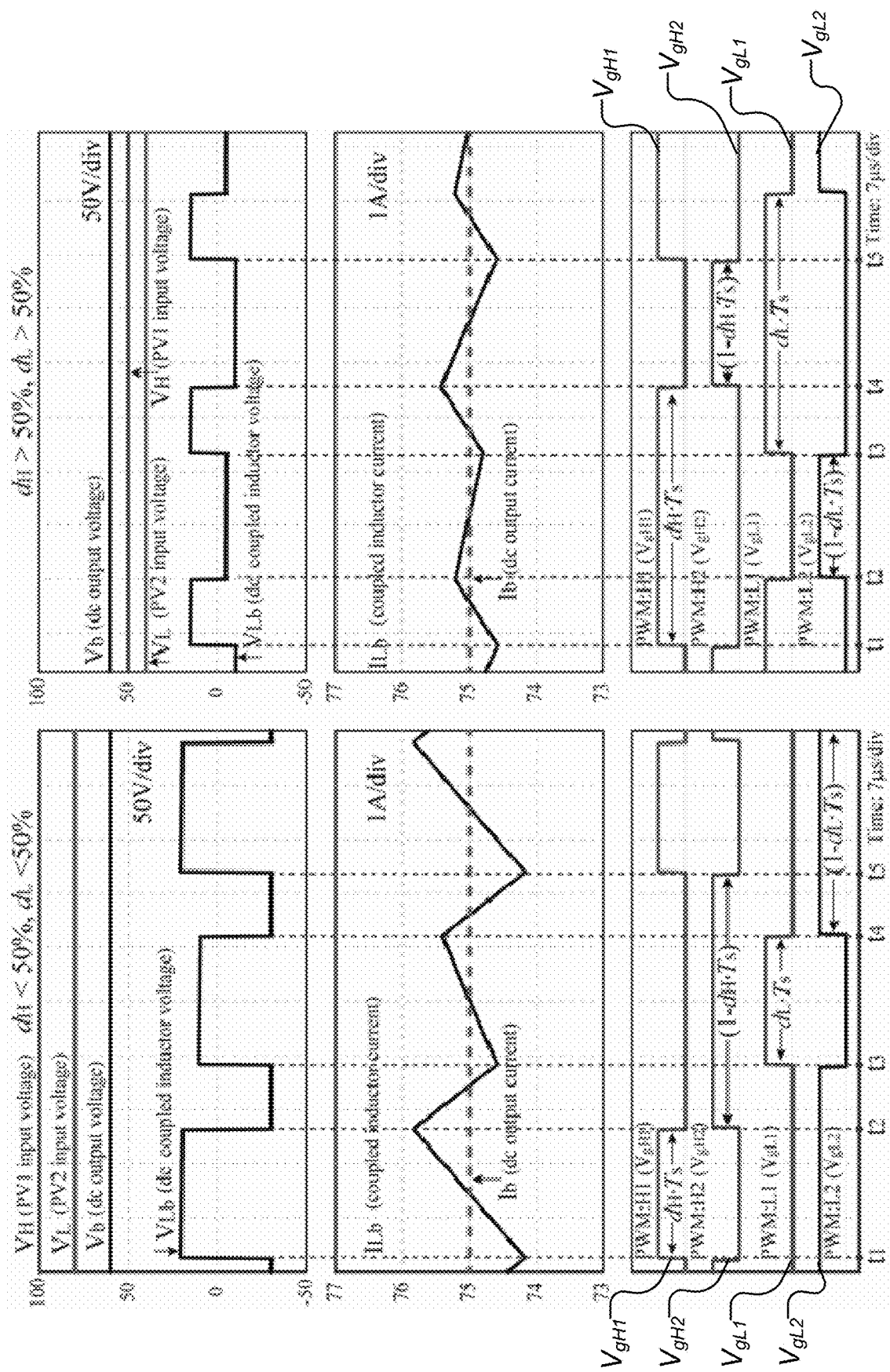
FIG. 1C provides a pair of switching diagrams for the FIG. 1B DC-DC converter for the conditions that $d_H<50\%$, $d_L<50\%$ (left hand diagram) and for $d_H>50\%$, $d_L>50\%$ (right hand diagram).
Figure 1D:
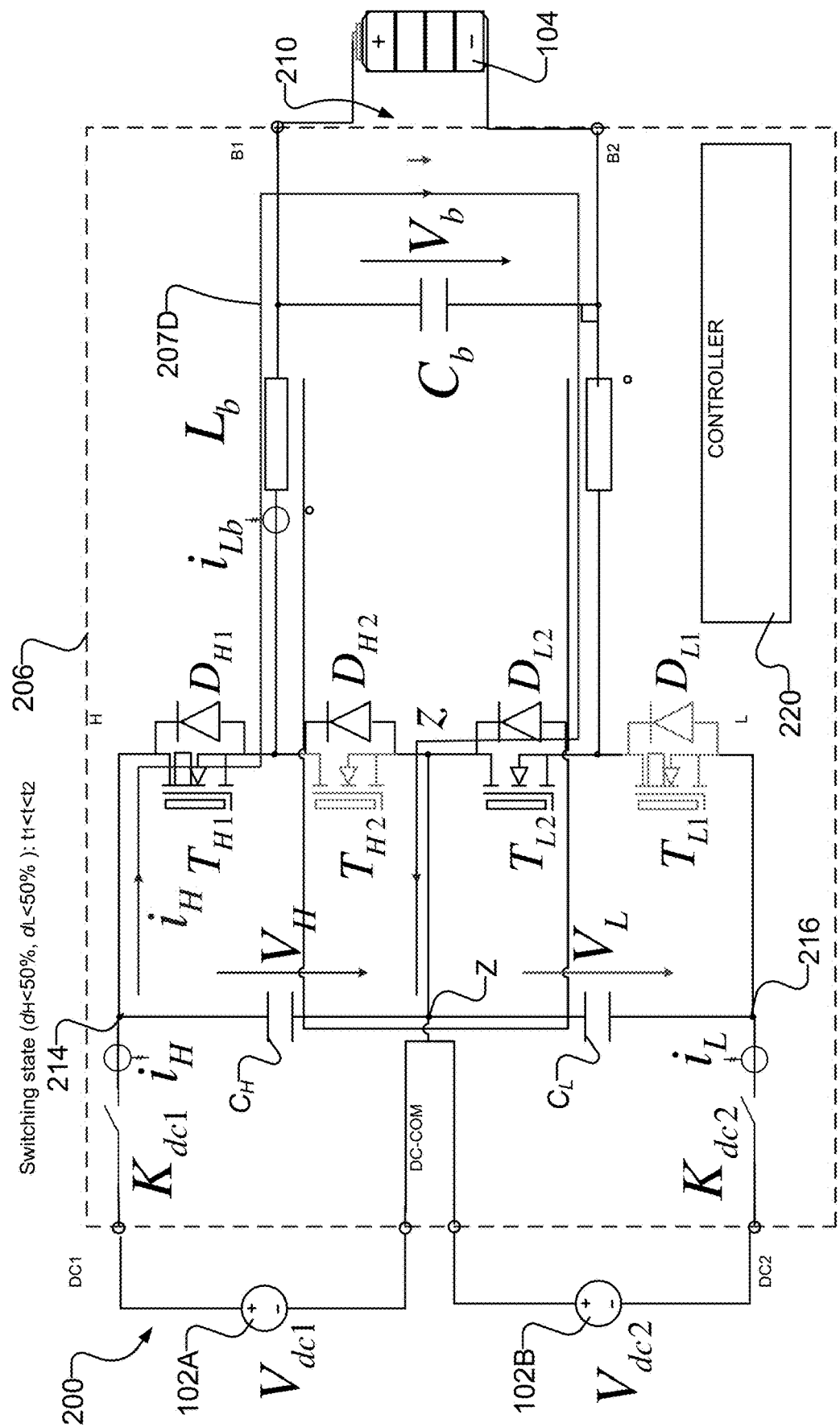
FIGS. 1D, 1E and 1F schematically depict current flow in the DC-DC converter of FIG. 1B in the various switching conditions shown by FIG. 1C.
Figure 1E:
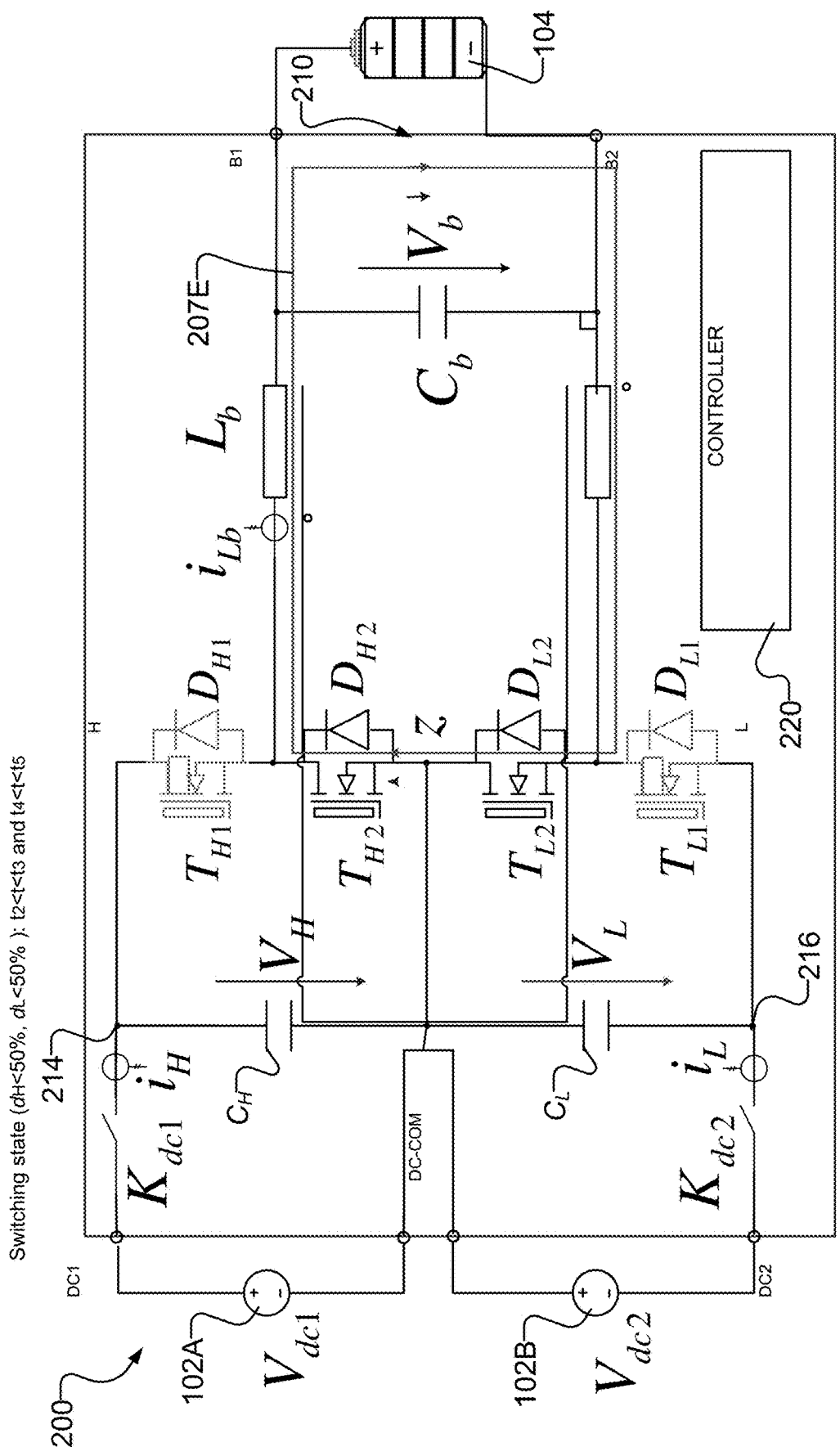
Figure 1F:
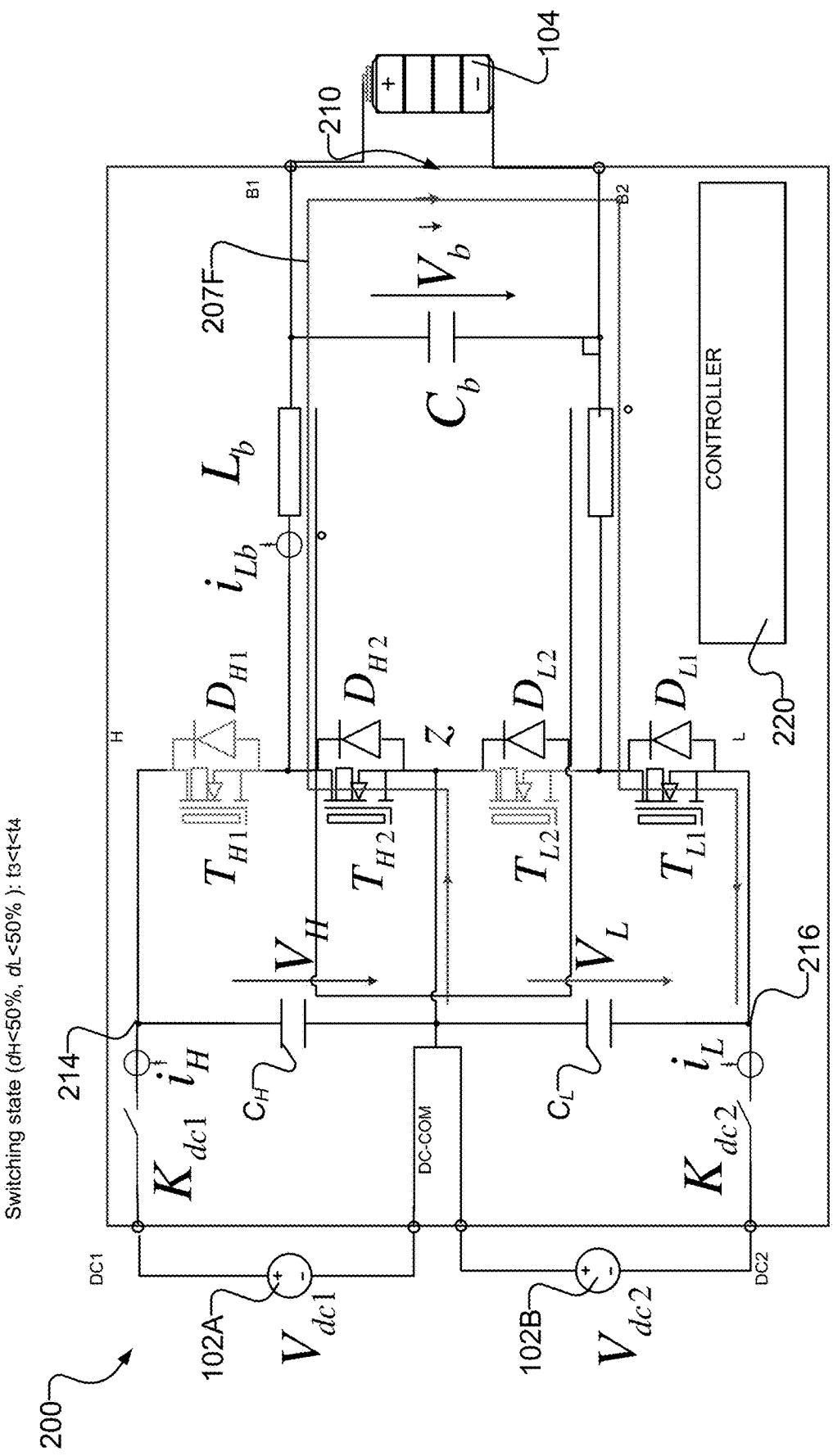

FIG. 1C provides a schematic illustration of the switching states of the FIG. 1B DC-DC converter 206 for the two cases: $d_H$<50%, $d_L$<50% (left hand diagram) and for $d_H$>50%, $d_L$>50% (right hand diagram), where $$d_H = \frac{t_{onH}}{T_S}$$

is the period of time ($t_{onH}$) during which switch $T_{H1}$ is conducting during a switching period $T_s$ and $$d_L = \frac{t_{onL}}{T_S}$$

is the period of time ($t_{onL}$) during which switch $T_{L1}$ is conducting during a switching period $T_s$. FIGS. 1D, 1E and 1F schematically depict current flow in the DC-DC converter of FIG. 1B in the various switching conditions shown by FIG. 1C.

It is desirable to switch switches $T_{H1}$, $T_{H2}$, $T_{L1}$, $T_{L2}$ of converter 206 with a duty cycle D while satisfying the following input-output voltage relation:

$$V_{dc1} + V_{dc2} \geq V_b \quad (2A)$$

so that a notional duty cycle D may be given by a formula according to:

$$D = \frac{V_b}{V_{dc1} + V_{dc2}} \quad (2B)$$

Therefore, the dc input utilization range for power conversion is extended, as per the following duty cycle expression over a switching period $T_s$:

$$D = d_H + d_L = \frac{t_{onH} + t_{onL}}{T_s} \quad (2C)$$

where $d_H$ and $d_L$ represent the duty cycles for the high and low sides of converter 206. Specifically, $$d_H = \frac{t_{onH}}{T_S}$$

is the period of time ($t_{onH}$) during which switch $T_{H1}$ is conducting during a switching period $T_s$ and $$d_L = \frac{t_{onL}}{T_S}$$

is the period of time ($t_{onL}$) during which switch $T_{L1}$ is conducting during a switching period $T_s$.

The left hand diagram in FIG. 1C shows DC-DC converter 200 in operation in the condition where $d_H$<50%, $d_L$<50%. In left hand diagram of FIG. 1C, the switching period $T_s$ has a duration of $t_5$–$t_1$. The lower plots of the left hand FIG. 1C diagram show four voltage signals, $V_{gH1}$, $V_{gH2}$, $V_{gL1}$, $V_{gL2}$ which respectively correspond to the gate signals at switches $T_{H1}$, $T_{H2}$, $T_{L1}$, $T_{L2}$. When signals $V_{gH1}$, $V_{gH2}$, $V_{gL1}$, $V_{gL2}$ are high, their corresponding switches $T_{H1}$, $T_{H2}$, $T_{L1}$, $T_{L2}$ are in conducting states and when signals $V_{gH1}$, $V_{gH2}$, $V_{gL1}$, $V_{gL2}$ are low, their corresponding switches $T_{H1}$, $T_{H2}$, $T_{L1}$, $T_{L2}$ are in non-conducting states. In the time between $t_1$ and $t_2$ in the left hand side of FIG. 1C, $V_{gH1}$ and $V_{gL2}$ are high and $V_{gH2}$ and $V_{gL1}$ are low, meaning that switches $T_{H1}$ and $T_{L2}$ are conducting, whereas switches $T_{H2}$, $T_{L1}$ are non-conducting. In this circumstance, the current flow (shown by arrowed line 207D in FIG. 1D) flows from PV array 102A, through node 214, through switch $T_{H1}$ (charging inductor $L_b$ and capacitor $C_b$) and through node B1 of output port 210 to EES 104 and returns through node B2 of output port 210, through switch $T_{L2}$ (and/or diode $D_{L2}$) and common node Z. In the time between $t_2$ and $t_3$ in the left hand side of FIG. 1C, $V_{gH2}$ and $V_{gL2}$ are high and $V_{gH1}$ and $V_{gL1}$ are low, meaning that switches $T_{H2}$ and $T_{L2}$ are conducting, whereas switches $T_{H1}$, $T_{L1}$ are non-conducting. In this circumstance, which may be referred to as a "freewheeling state, the energy stored in the inductor $L_b$ provides current flow (shown by arrowed line 207E in FIG. 1E) through node B1 of output port 210 to EES 104, from EES 104 through node B2 of output port 210, through switch $T_{L2}$ (and/or diode $D_{L2}$), and through switch $T_{H2}$ (and/or diode $D_{H2}$) back to inductor $L_b$.

In the time between $t_3$ and $t_4$ in the left hand side of FIG. 1C, $V_{gH2}$ and $V_{gL1}$ are high and $V_{gH1}$ and $V_{gL2}$ are low, meaning that switches $T_{H2}$ and $T_{L1}$ are conducting, whereas switches $T_{H1}$, $T_{L2}$ are non-conducting. In this circumstance, the current flow (shown by arrowed line 207F in FIG. 1F) flows from PV array 102B, through common node Z, through switch $T_{H2}$ and/or diode $D_{H2}$ (charging inductor $L_b$ and capacitor $C_b$) and through node B1 of output port 210 to EES 104 and returns through node B2 of output port 210, through switch $T_{L1}$ and node 216. In the time between $t_4$ and $t_5$ in the left hand side of FIG. 1C, $V_{gH2}$ and $V_{gL2}$ are high and $V_{gH1}$ and $V_{gL1}$ are low, meaning that switches $T_{H2}$ and $T_{L2}$ are conducting, whereas switches $T_{H1}$, $T_{L1}$ are non-conducting. This circumstance is another free-wheeling state where the energy stored in the inductor $L_b$ current flow (shown by arrowed line 207E in FIG. 1E) through node B1 of output port 210 to EES 104, from EES 104 through node B2 of output port 210, through switch $T_{L2}$ (and/or diode $D_{L2}$), and through switch $T_{H2}$ (and/or diode $D_{H2}$) back to inductor $L_b$.

For the situation in the left hand side of FIG. 1C, where $d_H$<50%, $d_L$<50%, the instantaneous inductor voltage $v_{Lb}$ is given by:

$$v_{Lb}(t) = \begin{cases} V_H - V_b & \text{for } t_1 < t \le t_2 \\ -V_b & \text{for } t_2 < t \le t_3 \\ V_L - V_b & \text{for } t_3 < t \le t_4 \\ -V_b & \text{for } t_4 < t \le t_5 \end{cases} \quad (2D)$$

The right hand diagram in FIG. 1C shows DC-DC converter 200 in operation in the condition where $d_H$>50%, $d_L$>50%. Like the left hand diagram of FIG. 1C, the right hand diagram of FIG. 1C, includes four voltage signals, $V_{gH1}$, $V_{gH2}$, $V_{gL1}$, $V_{gL2}$ which respectively correspond to the gate signals at switches $T_{H1}$, $T_{H2}$, $T_{L1}$, $T_{L2}$. Because $d_H$>50%, $d_L$>50% in the right hand diagram of FIG. 1C, there is one additional circumstance (where both $T_{H1}$ and $T_{L1}$ are conducting) that is not present in the case where $d_H$<50%, $d_L$<50%. For example, in the time period between $t_1$ and $t_2$ and in the time period between $t_3$ and $t_4$, both $T_{H1}$ and $T_{L1}$ are conducting and both $T_{H2}$ and $T_{L2}$ are non-conducting, in which case current flows from PV array 102A, through node 214, through switch $T_{H1}$ (charging inductor $L_b$ and capacitor $C_b$) and through node B1 of output port 210 to EES 104 and returns through node B2 of output port 210, through switch $T_{L1}$ and node 216 to PV arrays 102B. For the right hand side of FIG. 1C, in the time between $t_2$ and $t_3$, $V_{gH1}$ and $V_{gL2}$ are high and $V_{gH2}$ and $V_{gL1}$ are low, meaning that switches $T_{H1}$ and $T_{L2}$ are conducting, whereas switches $T_{H2}$, $T_{L1}$ are non-conducting. In this circumstance, the current flow (shown by arrowed line 207D in FIG. 1D) flows from PV array 102A, through node 214, through switch $T_{H1}$ (charging inductor $L_b$ and capacitor $C_b$) and through node B1 of output port 210 to EES 104 and returns through node B2 of output port 210, through switch $T_{L2}$ (and/or diode $D_{L2}$) and common node Z. For the right hand side of FIG. 1C, in the time between $t_4$ and $t_5$, $V_{gH2}$ and $V_{gL1}$ are high and $V_{gH1}$ and $V_{gL2}$ are low, meaning that switches $T_{H2}$ and $T_{L1}$ are conducting, whereas switches $T_{H1}$, $T_{L2}$ are non-conducting. In this circumstance, the current flow (shown by arrowed line 207F in FIG. 1F) flows from PV array 102B, through common node Z, through switch $T_{H2}$ and/or diode $D_{H2}$ (charging inductor $L_b$ and capacitor $C_b$) and through node B1 of output port 210 to EES 104 and returns through node B2 of output port 210, through switch $T_{L1}$ and node 216.

For the situation in the left hand side of FIG. 1C, where $d_H$>50%, $d_L$>50%, the instantaneous inductor voltage $v_{Lb}$ is given by:

$$v_{Lb}(t) = \begin{cases} (V_H + V_L) - V_b & \text{for } t_1 < t \le t_2 \\ V_H - V_b & \text{for } t_2 < t \le t_3 \\ (V_H + V_L) - V_b & \text{for } t_3 < t \le t_4 \\ V_L - V_b & \text{for } t_4 < t \le t_5 \end{cases} \quad (2E)$$

Notably, as per equation (2A), it is not necessary that both $V_{dc1}$ and $V_{dc2}$ be greater than $V_b$ for both of the corresponding PV arrays 102A, 102B to contribute to the power supplied to EES 104, as was the case with the FIG. 1A prior art system 100 and DC-DC converters 106. In contrast, because of the topology of DC-DC converter 206 (e.g. the common node Z shared between input ports 208A, 208B), the DC input voltages $V_{dc1}$ and $V_{dc2}$ for system 200 and DC-DC converter 206 can each be higher or lower than the output voltage $V_b$, provided that the sum of the two input voltages is higher than the desired output voltage $V_b$ as set out in equation (2A). This equation (2A) characteristic of system 200 and converter 206 is particularly advantageous for energy harvesting applications where the power from individual sources may vary widely (e.g. like solar applications, where one PV array may be in the shade while another is in the sun, wind energy applications where one wind energy source may be in strong wind, while another wind energy source is in a lower wind region and/or the like). Since the equation (2A) allows the individual DC input voltages $V_{dc1}$ and $V_{dc2}$ to vary widely, the DC input voltage utilization range of DC-DC converter 206 may be significantly higher than that of prior art DC-DC converters 106, which in turn permits system 200 to have relatively high power production compared to prior art system 100.

Notably, comparing equations (2A) and (1) demonstrate the DC input voltage extension that permits a relatively wider range of DC input voltage for energy harvesting/power production in converter 206 (FIG. 1B) relative to converter 106 (FIG. 1A).

Another characteristic of the FIG. 1B converter 206 topology is that the two (upper and lower) groups of switches $T_{H1}/D_{H1}$, $T_{H2}/D_{H2}$ and $T_{L1}/D_{L1}$, $T_{L2}/D_{L2}$ can operate independently of one another. This characteristic can be capitalized for redundancy in operation. For example, if one group of switches ceases operation, the other group of switches continues in operation for critical power delivery applications (e.g. aerospace, electric vehicles, life support, etc).

Another characteristic of the FIG. 1B converter 206 topology and its common node Z is flexibility of system earth grounding or floating of the input sources. For example, the common node Z can be connected to the system earth ground, if desired. The advantage of this characteristic is that, the maximum hazardous voltage (i.e. each input voltage with respect to earth ground) is reduced relative to when the common node Z is floating (i.e. not earth grounded).

In some particular embodiments (for example, where $V_b$=60V as a typical desired output level for charging a 48V-type EES 104 and the sum of the input voltages ($V_{dc1}$+$V_{dc2}$) may range up to 600V), a practical selection of PV array input voltage utilization ratio ($V_{maxDC}$:$V_{minDC}$) for power conversion using system 200 and/or DC-DC converter 206 is 10:1. It will be appreciated that other voltage utilization ratios could be selected. Table I shows a non-limiting example system specification for the FIG. 1B power conversion system 200 ad DC-DC converter 206 with this implementation.

TABLE I

KEY SYSTEM SPECIFICATIONS FOR NON-LIMITING EXAMPLE

| Parameter | Specifications |
|---|---|
| Numbers of input DC sources | 1x or 2x DC sources (flexible configuration) |
| PV array operating voltage | 30 V-600 V |
| Maximum PV input current | 21 A (600 V) and 2x 21 A (2x 300 V) |
| Nominal battery voltage | 24 V, 48 V |
| Max. PV array open circuit voltage | 600 V or 2x 300 V |
| Battery voltage operating range | 0-100 V |
| Max. charge current | 100 A |
| Max. output power | 6000 W |
| Max. power conversion efficiency | >98% |
| Full power conversion efficiency | >97% |
| Idle loss | <1.5 W |
| Ambient air temperature for converter operation | −40° C. to 70° C. |

FIG. 1B also shows that DC-DC converter 206 may additionally or alternatively be connected in another configuration to a single input power source 218 (e.g. a single PV array 218 in the illustrated configuration). PV array 218 may comprise a plurality of PV cells or arrays connected in series. With this configuration, the single PV array 218 is connected to input nodes 214, 216 as shown schematically in FIG. 1B. FIG. 1B depicts the configuration flexibility of converter 206, from a dual input source (e.g. PV arrays 102A, 102B as described above) to a single input source (e.g. PV array 218). In this case, the common node z can be left floating (not connected) or connected to ground/earth ground (per above explanations in regard to the ground schemes). The switching states and currents of DC-DC converter 206 in this single-input configuration may be similar to those of the example shown in FIGS. 1C-1F, where the single-input configuration may be considered to be a particular case of the dual-input configuration where $v_H = V_{dc1} = v_L = V_{dc2}$.

When DC-DC converter 206 is connected to a single input power source 218, it may be advantageous (e.g. to balance device losses), to control converter 206 (e.g. using controller 220) to operate with the duty cycles $d_H$ and $d_L$ for the high and low sides of converter 206 that are equal to one another and set according to the combination of the voltages $v_H$, $v_L$ at their respective input capacitors $C_H$, $C_L$. For example:

$$d_{HL} = \frac{V_b}{V_H + V_L} \quad (2F)$$

$$d_H \cong d_L \cong \frac{d_{HL}}{2} \quad (2G)$$

where $d_{HL}$ may be referred to as a combined duty cycle and, in normal operation, switches $K_{dc1}$ and $K_{dc2}$ are conducting and $v_H = V_{dc1}$ and $v_L = V_{dc2}$.

The ability of the FIG. 1B converter 206 to connect to a single input voltage source or to a pair of input voltage sources provides flexible configuration options when compared to prior art DC-DC converters.

FIG. 2A shows exemplary plots of current-voltage (I-V) characteristics 310A, 310B, power-voltage (P-V) characteristics 312A, 312B and operational power conversion area 306 for a prior art DC-DC converter for a prior art system comprising 2 parallel-connected PV arrays (like those shown in FIG. 1A) at 50° C. and 0° C. This exemplary prior art converter (referred to as traditional converter B in FIG. 2A) has an operation voltage between 300V-600V ($V_{oc}$=600V). FIG. 2A also shows exemplary plots of current-voltage (I-V) characteristics 310C, 310D, power-voltage (P-V) characteristics 312C, 312D and operational power conversion area 305 for a prior art DC-DC converter for 5 parallel-connected PV arrays at 50° C. and 0° C. This exemplary prior art converter (referred to as traditional converter A in FIG. 2A) has an operation voltage between 60V-150V ($V_{oc}$=150V). The characteristics illustrated in the plots of FIG. 2A are under relatively typical test conditions in accordance with PV modules (Standard Test Conditions (STC) of, irradiance of 1 kW/m² and 25° C. cell temperature).

The I-V characteristics shown in FIG. 2A include a pair of IV-curves 310A, 310B, which correspond to traditional converter B at PV cell junction temperatures of 50° C. and 0° C. respectively and a pair of IV-curves 310C, 310D, which correspond to traditional converter A at PV cell junction temperatures of 50° C. and 0° C. respectively. This PV cell junction temperature range (0° C.-50° C.) corresponds to a typical application range for PV array operation. Similarly, P-V characteristics shown in FIG. 2A include a pair of P-V curves 312A, 312B which corresponding to traditional converter B at PV cell junction temperatures of 50° C. and 0° C. respectively and a pair of P-V curves 312C, 312D which corresponding to traditional converter A at PV cell junction temperatures of 50° C. and 0° C. respectively. The shaded power conversion area 306 depicted in FIG. 2A shows the input voltage range over which useful power can be generated from, and the maximum power that can be harvested by, traditional converter B which corresponds to the FIG. 1A prior art energy harvesting system 100. The shaded power conversion area 305 depicted in FIG. 2A shows the input voltage range over which useful power can be generated from, and the maximum power that can be harvested by, traditional converter A which corresponds to a system like that of FIG. 1A prior art energy harvesting system 100 with five DC-DC converters 106 connected in parallel. There is a general desire for the area of these power conversion regions 305, 306 to be a maximum—e.g. to be capable of providing high output power over a large input voltage range.

FIG. 2B depicts exemplary I-V (current-voltage) characteristics, P-V (power voltage) characteristics and operational power conversion area 326 for the power generation system 200 of FIG. 1B at 50° C. and 0° C. The I-V characteristics shown in FIG. 2B include a pair of curves 330A, 330B for the single PV input configuration shown in FIG. 1B at 50° C. and 0° C. respectively and a pair of curves 330C, 330D for the dual PV input configuration shown in FIG. 1B at 50° C. and 0° C. respectively. P-V characteristics 324 include a pair of curves 332A, 332B for the single PV input configuration shown in FIG. 1B at 50° C. and 0° C. respectively and a pair of curves 332C, 332D for the dual PV input configuration shown in FIG. 1B at 50° C. and 0° C. respectively. The characteristics illustrated in the plots of FIG. 2B are under relatively typical test conditions in accordance with PV modules (Standard Test Conditions (STC) of, irradiance of 1 kW/m² and 25° C. cell temperature). The shaded power conversion area 326 depicted in FIG. 2B shows the input voltage range over which useful power can be generated from the FIG. 1B energy harvesting system 200 and the maximum power that can be harvested by the FIG. 1B energy harvesting system 200. There is a general desire for the area of power conversion region 326 to be a maximum.

Comparing the shaded power conversion areas 306, 326 of FIGS. 2A and 2B shows how the increased DC input voltage utilization range or ratio of power generation system 200 (FIG. 1B) relative to the prior art system 100 (FIG. 1A) leads to an increased area of power production region 326 relative to that of power conversion region 306. DC-DC converter 206 of the FIG. 1B embodiment can operate from a lower range of input voltage to a higher range of input voltage than parallel-connected DC-DC converters 106A, 106B of FIG. 1A. This flexibility of the FIG. 1B DC-DC converter 206 (as shown in FIG. 2B) also contrasts with prior art systems (as shown in FIG. 2A), where completely different systems are used for high voltage operation and for low voltage operation. This range of input voltage for DC-DC converter 206 of the FIG. 1B embodiment may provide the following additional benefits, for example. Wide dc voltage utilization leads to extended PV power production while at low voltage which can enable converter 206 to harvest energy from PV arrays under low solar irradiance. The ability to operate at higher voltage leads to lower installation cost due to reduced size in dc (PV) cables, dc breakers, fuses, wiring boxes and the like.

Table II shows a comparison between the prior art dc-dc converter 106 of FIG. 1A and the dc-dc converter 206 of FIG. 1B. Table II illustrates that DC-DC converter 206 differentiates from the prior art converter 106 in performance, flexibility and cost.

1B. Except where dictated by the context, references herein to PV arrays 102A, 102B of FIG. 1B may be understood to include DC power sources 102A, 102B shown in FIG. 3A. Except where dictated by the context, a reference herein to PV arrays 218 of FIG. 1B may be understood to include DC power source 218 shown in FIG. 3B.

Operational modes for power conversion for the FIG. 1B (or FIG. 3A, 3B) power conversion system 200 and DC-DC converter 206 are now described. DC-DC converter 206 may be controlled in at least two aspects, which are described below. These aspects include control of input-output power regulation 222 and control of DC initialization of pre-charge input voltage 224. These control techniques may be implemented by controller 220 (see FIGS. 1B, 3A, 3B) and FIG. 4A).

Controller 220 may comprise one or more processors which may have access to memory storing computer-readable instructions which may be executed by the one or more processors. In general, such processors may comprise any suitable processor, such as, for example, a suitably configured computer, microprocessor, microcontroller, digital signal processor, field-programmable gate array (FPGA), other type of programmable logic device, pluralities of the foregoing, combinations of the foregoing, and/or the like. Such a processor may have access to software which may be stored in computer-readable memory accessible to the processor and/or in computer-readable memory that is integral to the processor. The processor may be configured to read and execute such software instructions and, when executed

TABLE II

DC-DC SOLAR CONVERTERS FOR 48 V-SYSTEMS COMPARISON SUMMARY

| Criterion Traditional DC-DC | FIG. 1A Converter | FIG. 1B Converter |
| --- | --- | --- |
| MPPT range (DC input utilization ratio) $V_{maxDC}$:$V_{minDC}$ | 3:1 | 10:1 |
| PV power production | Standard | Optimized (wide MPPT range) |
| PV system power production at low irradiance levels | Restricted (e.g. <$V_{MPP}$, $P_{lim}$) | Optimized (e.g. $V_{MPP}$, $P_{MPP}$, wide MPPT range) |
| System cost/W | Standard | Optimized due to system topology and integrated coupled inductor |
| System weight/power density | Standard | Optimized due to system topology and integrated coupled inductor |
| Installation cost/W | Standard | Optimized due to system topology and integrated coupled inductor |
| Flexibility in PV array/string configuration for different rooftop orientations | Restricted (single MPPT) | Improved flexibility: single or two MPPT options |
| PV Grounding | Typical extra jumper/configuration is necessary | Simplified. Does not require additional jumper/configuration |
| Component stress | Standard | Reduced: three-level DC-DC topology with improved integrated DC pre-charge function |
| Conversion efficiency | Standard | Improved efficiency: low ripple current through the filter elements due to coupled inductor integration |
| PV Independent operation with imbalanced loading (voltage/power) | Not applicable | Balanced or imbalanced PV input capability |

Figures 3A, 3B:
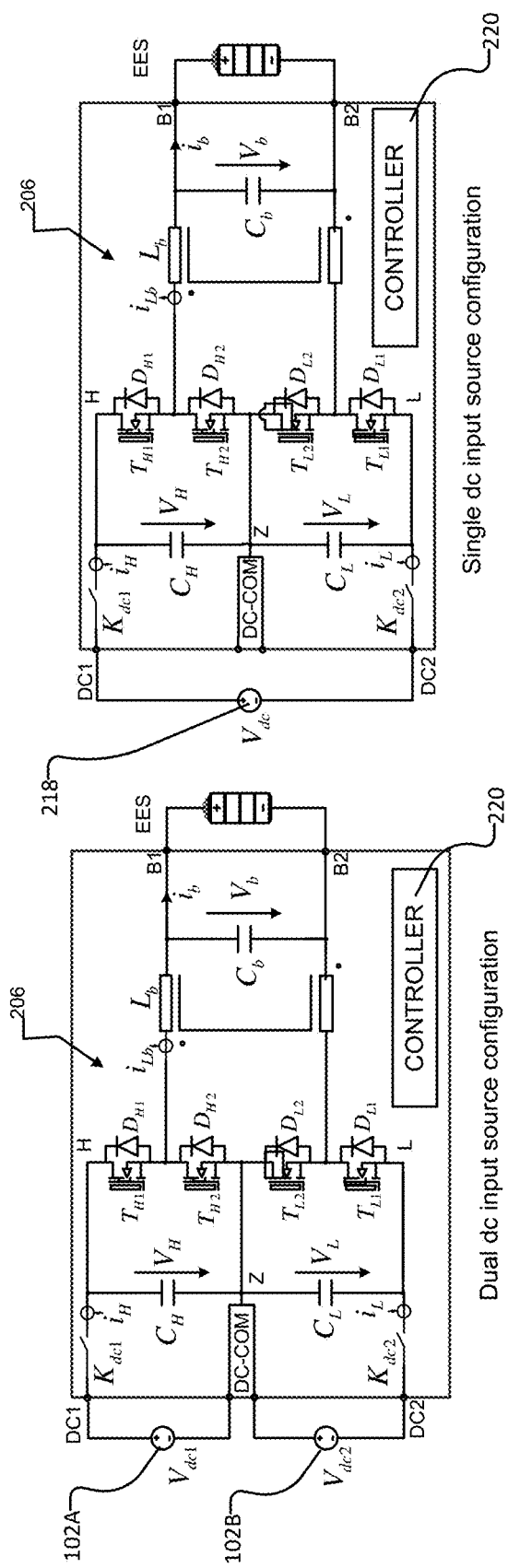
FIG. 3A is a schematic circuit diagram of a DC-DC converter according to a particular embodiment connected to dual DC input sources.
FIG. 3B is a schematic circuit diagram of the FIG. 3A DC-DC converter connected to a single DC input source.

FIG. 3A shows DC-DC converter 206 respectively connected to a pair of DC voltage inputs $V_{dc1}$, $V_{dc2}$ and FIG. 3B shows DC-DC converter 206 connected to a single DC input $V_{dc}$. In the exemplary drawings of FIGS. 3A and 3B, the DC inputs $V_{dc1}$, $V_{dc2}$ and $V_{dc}$ are not limited to PV arrays, but the power converters 206 of FIGS. 3A and 3B are the same as those of FIG. 1B. Other than for different DC input sources, the drawings in FIGS. 3A and 3B are the same as the two-input and single-input configurations shown in FIG.

by the processor, such software may cause the processor to implement some of the functionalities described herein.

Control Strategy for Input-Output Power Regulation

Figure 4A:
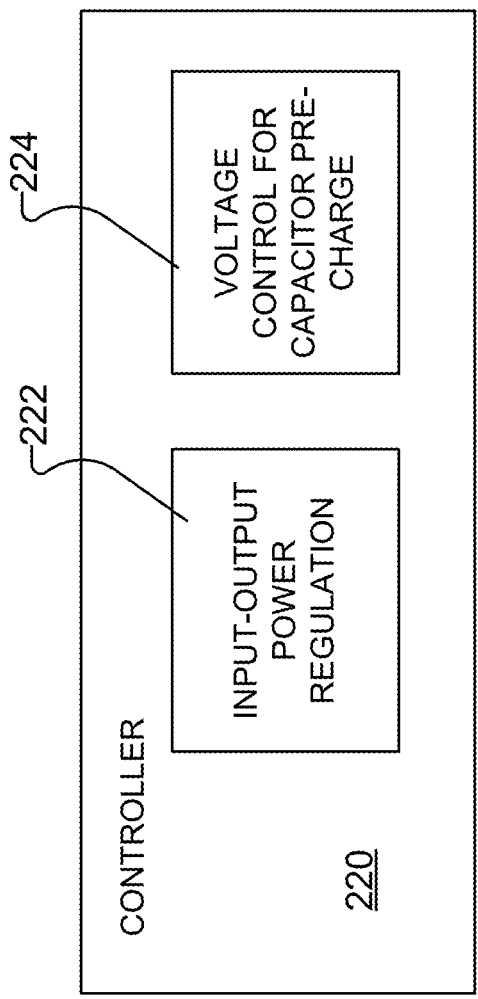
FIG. 4A is a schematic diagram of a controller for the DC-DC converter of FIGS. 1B, 3A and/or 3B showing a number of the controller's functionalities.
Figure 4B:
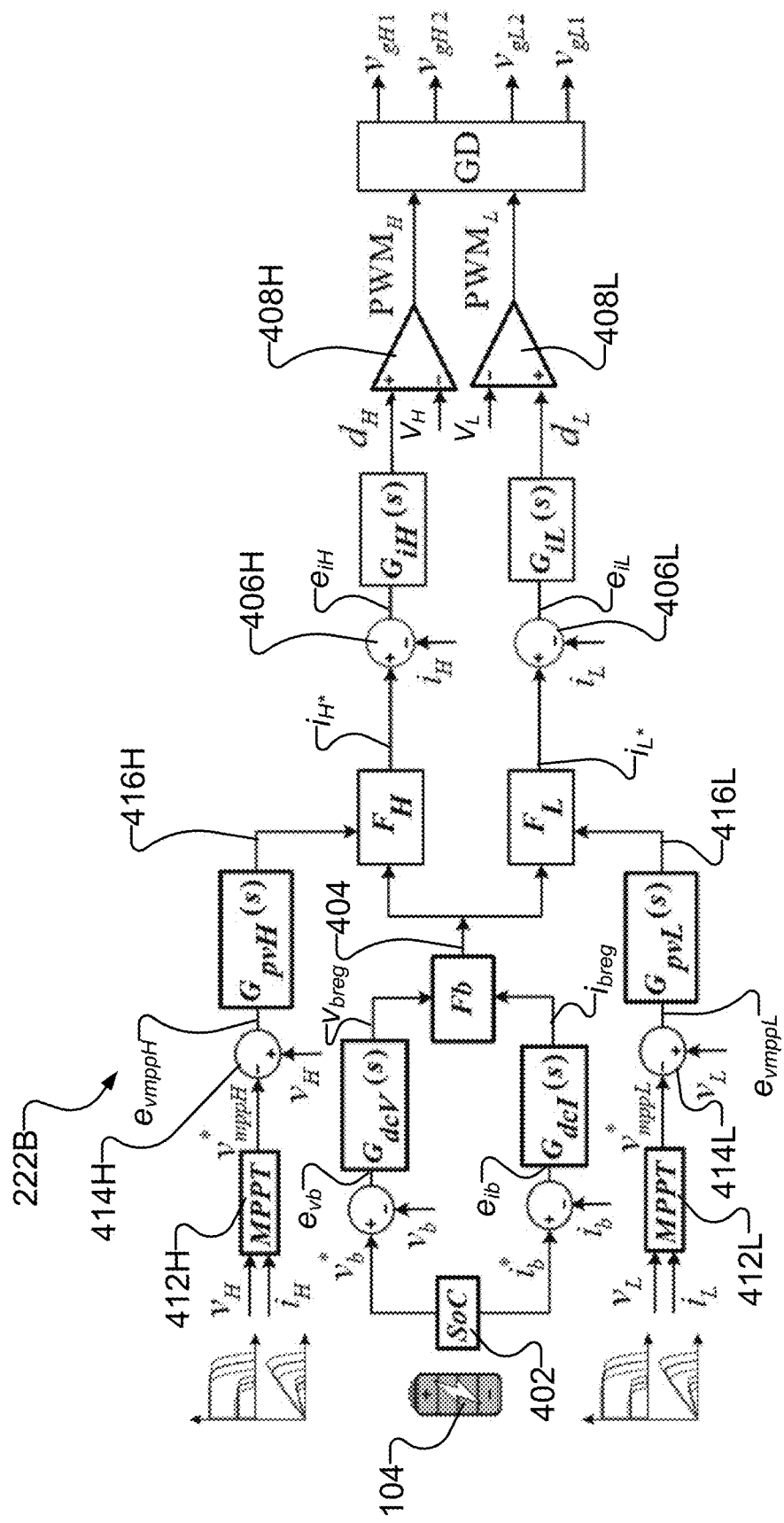
FIG. 4B is a schematic diagram of a control strategy for the input-output power regulation of the FIG. 4A controller for the FIG. 3A dual DC input source connection according to a particular embodiment.
Figure 4C:
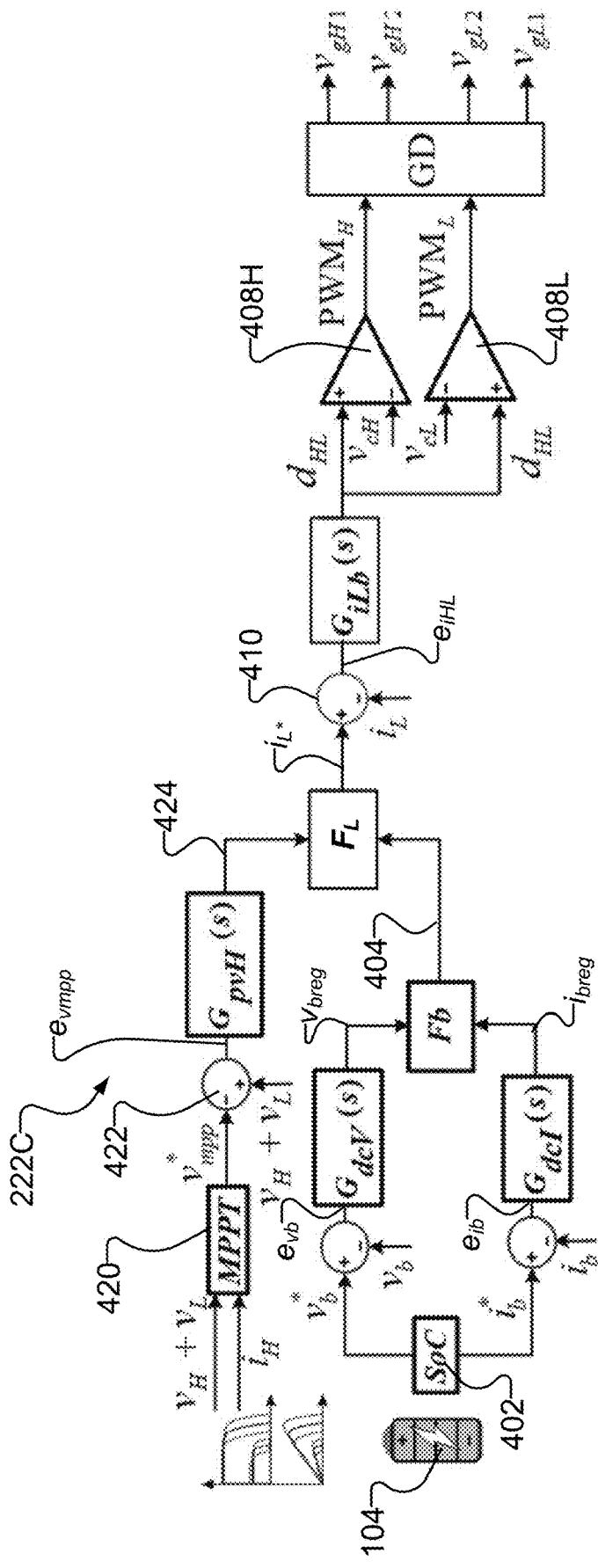
FIG. 4C is a schematic diagram of a control strategy for the input-output power regulation of the FIG. 4A controller for the FIG. 3B single DC input source connection according to a particular embodiment.

In accordance with a particular example embodiment, control of input-output power regulation 222 may be achieved using the control strategy 222B shown in FIG. 4B (for dual DC inputs 102A, 102B) and using the control strategy 222C shown in FIG. 4C (for single dc input 218).

One objective of the control strategy 222B, 222C (together, control strategy 222) in either case is to control or regulate the output voltage $V_b$ and the output current $i_b$ to meet the specifications (e.g. desired voltage and current set points $v_b^*$, $i_b^*$) of EES 104. The set points $v_b^*$, $i_b^*$ of EES 104 may vary over time depending on the state of charge (SOC) 402 of EES 104. SOC 402 of EES 104 may be determined by suitable sensors (not shown) or may be a discernable (e.g. output) parameter of EES 104. The outputs of the output power control strategy 222 in either case are the switch control signals (e.g. gate voltages, in the illustrated embodiment of FIGS. 1B, 4B and 4C) $v_{gH1}$, $v_{gH2}$, $v_{gL1}$, $v_{gL2}$, which in turn dictate the switching parameters (e.g. duty cycles $d_H$, $d_L$ (dual input) or $d_{HL}$ (single input)) of DC-DC converter 206, as explained above. In the case of dual input control strategy 222B (FIG. 4B), these duty cycles are $d_H$ and $d_L$ respectively represent the duty cycles for switch pairs $T_{H1}$, $T_{H2}$ and $T_{L1}$, $T_{L2}$, as discussed above. In the case of single input control strategy, this duty cycle is $d_{HL}$, which represents the common duty cycle control for switch pairs $T_{H1}$, $T_{H2}$ and $T_{L1}$, $T_{L2}$.

$$\begin{cases} d_{HL} = d_H + d_L \\ V_b = d_H V_H + d_L V_L \end{cases} \quad (3)$$

Voltage regulator $G_{dcV}(s)$ and current regulator $G_{dcI}(s)$ receive error signals $e_{vb}$, $e_{ib}$ reflective of the differences between actual output voltage and current $V_b$, $i_b$ (e.g. as measured) and desired voltage and current (e.g. EES set points) $v_b^*$, $i_b^*$ and output regulated voltage and current signals $v_{breg}$, $i_{breg}$. The selection function $F_b$ synthesizes the regulated voltage signal $v_{breg}$ from voltage regulator $G_{dcV}(s)$ and regulated current signal $i_{breg}$ from current regulator $G_{dcI}(s)$ and generates synthesized signal 404. When the EES set-points $v_b^*$, $i_b^*$ are attained, then the control signal 404 is further processed by the selection functions $F_H$, $F_L$ (in the case of dual input control strategy 222B) to generate reference currents $i_H^*$, $i_L^*$ or by selection function $F_L$ (in the case of single input control strategy 222C) to generate reference current $i_L^*$. In the case where the EES set-points $v_b^*$, $i_{b*}$ are attained, selection functions $F_H$, $F_L$ may involve selection of output power regulation (e.g. over input power regulation described below).

In the case of the dual input control strategy 222B (FIG. 4B), the reference currents $i_{H*}$, $i_{L*}$ are compared to measured current values $i_H$, $i_L$ at summing junctions 406H, 406L to generate current error signals $e_{iH}$, $e_{iL}$. Measured current values $i_H$, $I_L$ may be measured from converter 206 (see FIG. 1B or 3A) using any suitable current sensor or current sensing circuit. These current error signals $e_{iH}$, $e_{iL}$ are then provided to current regulators $G_{iH}(s)$, $G_{iL}(s)$ which output duty cycle signals $d_H$, $d_L$ for the pair of switches $T_{H1}$, $T_{H2}$ and $T_{L1}$, $T_{L2}$ respectively. These duty cycle signals $d_H$, $d_L$ are compared to signals $v_H$, $v_L$ (i.e. the voltages at capacitors $C_H$, $C_L$ (FIGS. 1B, 3A, 3B)) by logic blocks 408H, 408L (e.g. which may comprise software-based components which may function like comparators) to generate pulse width modulation signals $PWM_H$ and $PWM_L$. Pulse width modulation signals $PWM_H$ and $PWM_L$ are processed by gate drive component(s) GD which output switch control signals (e.g. gate voltages, in the illustrated embodiment of FIGS. 1B and 4B) $v_{gH1}$, $v_{gH2}$, $v_{gL1}$, $v_{gL2}$, which dictate the switching parameters (e.g. duty cycles) of DC-DC converter 206 as discussed above.

In the case of the single input control strategy 222A (FIG. 4C), the reference current $i_{L*}$ is compared to measured current value $i_L$ at summing junction 410 to generate current error signal $e_{iHL}$. Measured current value $i_L$ may be measured from converter 206 (see FIGS. 1B, 3A) using any suitable current sensor or current sensing circuit. This current error signal $e_{iHL}$ may then be provided to current regulator $G_{iLb}(s)$ which outputs the common duty cycle signal $d_{HL}$ for switch pairs $T_{H1}$, $T_{H2}$ and $T_{L1}$, $T_{L2}$. This duty cycle signal $d_{HL}$ is compared to signals $v_H$, $v_L$ (i.e. the voltages at capacitors $C_H$, $C_L$ (FIG. 1B, 3B)) by logic blocks 408H, 408L (e.g. which may comprise software-based components which may function like comparators) to generate pulse width modulation signals $PWM_H$ and $PWM_L$. Pulse width modulation signals $PWM_H$ and $PWM_L$ are processed by gate drive component(s) GD which output switch control signals (e.g. gate voltages, in the illustrated embodiment of FIGS. 1B and 4C) $v_{gH1}$, $v_{gH2}$, $v_{gL1}$, $v_{gL2}$, which dictate the switching parameters (e.g. duty cycles) of DC-DC converter 206 as discussed above.

In addition to output power regulation, the control strategies 222B, 222C of the illustrated embodiments of FIGS. 4B, 4C may optionally also perform input power regulation. Input power regulation may be performed when the output power set points (e.g. $v_b^*$, $i_b^*$ referred to above) are not attained. In this circumstance, input power regulation may be performed to achieve maximum power production (e.g. MPPT) at output port 210 and EES 104.

In the dual input case of control strategy 222B (FIG. 4B), MPPT algorithms 412H, 412L receive input voltages $v_H$, $v_L$ and input currents $i_H$, $i_L$, assuming that switches $K_{dc1}$, $K_{dc2}$ are conducting and $v_H = V_{dc1}$, $v_L = V_{dc2}$ (see FIG. 1B and FIG. 3A) and use these inputs to calculate reference input voltages $v_{mppH}^*$, $v_{mppL}^*$ which will maximize energy harvesting. These reference input voltages $v_{mppH}^*$, $v_{mppL}^*$ are compared to the actual input voltages $v_H$, $v_L$ at summing junctions 414H, 414L to obtain input voltage error signals $e_{vmppH}$, $e_{vmppL}$. Input voltage regulators $G_{pvH}(s)$, $G_{pvL}(s)$ process these error signals $e_{vmppH}$, $e_{vmppL}$ to obtain control signals 416H, 416L. Assuming that the output voltage $v_b$ and current $i_b$ are less than the desired set points $v_b^*$, $i_b^*$, selection functions $F_H$, $F_L$ allow input power regulation (e.g. over output power regulation described above). For the case of input power regulation, selection functions $F_H$, $F_L$ process control signals 416H, 416L to generate reference currents $i_H^*$, $i_L^*$ based on input power regulation process control signals 416H, 416L. For the case of output power regulation, selection functions $F_H$, $F_L$ process control signal 404 to generate reference currents $i_H^*$, $i_L^*$ based on output power regulation process control signal 404, as discussed above. The remainder of the operation of control strategy 222B to generate switch control signals (e.g. gate voltages, in the illustrated embodiment of FIGS. 1B and 4B) $v_{gH1}$, $v_{gH2}$, $v_{gL1}$, $v_{gL2}$, which dictate the switching parameters (e.g. duty cycles) of DC-DC converter 206 is the same as that described above for the output power regulation case. The result of the DC input power regulation for the dual input control strategy 222B (FIG. 4B) is that the input voltages ($V_{dc1}$, $V_{dc2}$), which may be the outputs of DC inputs 102A, 102B, for example, are regulated to $V_{dc1} = v_H \approx v_{mppH}^*$ and $V_{dc2} = v_L \approx v_{mppl}^*$, where the approximate equalities are indicative of the control objectives.

In the single input case of control strategy 222C (FIG. 4C), MPPT algorithm 420 receives input voltage $v_H + v_L$ and input current $i_H$, assuming that switches $K_{dc1}$, $K_{dc2}$ are conducting and $v_H = V_{dc1}$, $v_L = V_{dc2}$ (see FIG. 1B and FIG. 3B) and use these inputs to calculate reference input voltage $v_{mpp}^*$, which will maximize energy harvesting. This reference input voltage $v_{mpp}^*$ is compared to the actual input voltages $v_H+v_L$ at summing junction 422 to obtain input voltage error signal $e_{vmpp}$. Input voltage regulator $G_{pvH}(s)$ processes this error signal $e_{vmpp}$ to obtain control signal 424. Assuming that the output voltage $v_b$ and current $i_b$ are less than the desired set points $v_b^*$, $i_b^*$, selection function $F_L$ allows input power regulation (e.g. over output power regulation described above). In the case of input power regulation, selection function $F_H$ processes control signal 424 to generate reference current $i_L^*$ based on control signal 424. For the case of output power regulation, selection function $F_H$ generates reference current $i_L^*$ based on output power regulation process control signal 404, as discussed above. The remainder of the operation of control strategy 222C to generate switch control signals (e.g. gate voltages, in the illustrated embodiment of FIGS. 1B and 4C) $v_{gH1}$, $v_{gH2}$, $v_{gL1}$, $v_{gL2}$, which dictate the switching parameters (e.g. duty cycles) of DC-DC converter 206 is the same as that described above for the output power regulation case. The result of the DC input power regulation for the single input control strategy 222C (FIG. 4C) is that the input voltage $V_{dc}$, which may be the output of DC input 218, for example, is regulated to $V_{dc}=v_H+v_L \approx v_{mpp}^*$ where the approximate equalities are indicative of the control objectives.

Control Strategy for Initialization of Input Pre-Charge

Referring back to FIG. 4A, another feature of various embodiments and aspects of the invention involves methods for control of initialization of input pre-charge 224. In a traditional power system (e.g. system 100 of FIG. 1A), at start-up, when switch $K_{dc1}$ or $K_{dc2}$ is closed (i.e. switches from a non-conducting state to a conducting state), an inrush current transient occurs between its corresponding input power source 102A, 102B (e.g. PV array, electrical energy storage, fuel-cells) and its corresponding input capacitors $C_H$, $C_L$. This inrush current tends to degrade the performance and lifetime of dc switches $K_{dc1}$, $K_{dc2}$ (typically a relay, contactor and/or the like) and input capacitors $C_H$, $C_L$.

Having regard to system 200 and DC-DC converter 206 of the FIG. 1B (or FIG. 3A, 3B) embodiments, initialization input pre-charge control method 224 (FIG. 4A) can mitigate this overstress of dc switches $K_{dc1}$, $K_{dc2}$ and/or capacitors $C_H$, $C_L$. Specifically, this overstress can be mitigated by pre-charging input capacitors $C_H$, $C_L$ at initialization. In some embodiments, input capacitors $C_H$, $C_L$ may be pre-charged to an initial voltage level, equal to the input voltage (e.g. to $v_H=V_{dc1}$ for capacitor $C_H$ to $v_L=V_{dc2}$ for capacitor $C_L$ in the case of the two input configuration of FIGS. 1B, 3A or to equal voltages $v_H$ (for capacitor $C_H$) and $v_L$ (for capacitor $C_L$), such that $v_H+v_L=V_{dc}$ in the case of the single input configuration of FIGS. 1B, 3B). With this approach, the lifetime of capacitors $C_H$, $C_L$ and dc switches $K_{dc1}$, $K_{dc2}$ of DC-DC converter 206 may be extended and/or DC-DC converter 206 may be fabricated with relatively inexpensive switches $K_{dc1}$, $K_{dc2}$ (e.g. switches $K_{dc1}$, $K_{dc2}$ with relatively low make/break current ratings) as compared to prior art converters (e.g. converters 106A, 106B of FIG. 1A).

Having regard to system 200 and DC-DC converter 206 of FIGS. 1B, 3A, 3B, DC-DC converter 206 permits bi-directional power conversion. Consequently, input capacitors $C_H$, $C_L$ can be charged with power from EES 104. In particular embodiments, input capacitors $C_H$, $C_L$ are charged with power from EES 104 just prior to switching input switches $K_{dc1}$, $K_{dc2}$ from non-conducting states to conducting states (from open to closed). The reverse current flows from EES 104 to pre-charge capacitors $C_H$, $C_L$ to a pre-determined voltage value may be accomplished by controlling the switch pairs $T_{H1}$, $T_{H2}$ and $T_{L1}$, $T_{L2}$ in a pre-charge boost mode in accordance with the control structure of FIG. 5. In some embodiments, when operating in pre-charge boost mode, the duty cycles of switch pairs $T_{H1}$, $T_{H2}$ and $T_{L1}$, $T_{L2}$ may be operated in accordance with equation (3).

The pre-charge voltage levels across input capacitors $C_H$, $C_L$ (i.e. input ports 208A, 208B) may be pre-charged to pre-charge set points $v_H^*$, $v_L^*$ which may be dynamically adjusted adaptive values that may be set at particular levels corresponding to the voltages $V_{dc1}$, $V_{dc2}$ output from input DC sources (e.g. PV arrays) 102A, 102B. For example, set points $v_H^*$, $v_L^*$ may be set to correspond to measured values of the voltages $V_{dc1}$, $V_{dc2}$ of DC sources 102A, 102B just prior to the switching of input switches $K_{dc1}$, $K_{dc2}$ to conducting states. These voltages $V_{dc1}$, $V_{dc2}$ may be measured using any suitable voltage sensors or voltage sensing circuits (not shown) and set points $v_H^*$, $v_L^*$ may be set such that $v_H^*=V_{dc1}$ and $v_L^*=V_{dc2}$. In the context of input capacitor pre-charging, the variables $v_H$, $v_L$ may be reserved to correspond to the voltages at input ports 208A, 208B prior to the switching of input switches $K_{dc1}$, $K_{dc2}$ to conducting states. In some embodiments, input switches $K_{dc1}$, $K_{dc2}$ may be switched to conducting states when the voltages $v_H$, $v_L$ at input ports 208A, 208B reach levels within some suitable threshold ranges of set points $v_H^*$, $v_L^*$ and/or within some suitable threshold ranges of the voltages $V_{dc1}$, $V_{dc2}$ output from input DC sources 102A, 102B. For example suitable threshold ranges may be expressed as:

$$|v_H-v_H^*|<a_H \tag{3A}$$

$$|v_L-v_L^*|<a_L \tag{3B}$$

or $$|v_H-V_{dc1}|<a_H \tag{4A}$$

$$|v_H-V_{dc2}|<a_L \tag{4B}$$

The thresholds $a_H$, $a_L$ may be same or may be different. In some embodiments, these thresholds may be set 5%, 10% or 20% of respective output voltages $V_{dc1}$, $V_{dc2}$. If input capacitors $C_H$, $C_L$ are pre-charged to within these threshold ranges, inrush current transients which may damage input capacitors $C_H$, $C_L$ and/or input switches $K_{dc1}$, $K_{dc2}$ can be mitigated.

Figure 5:
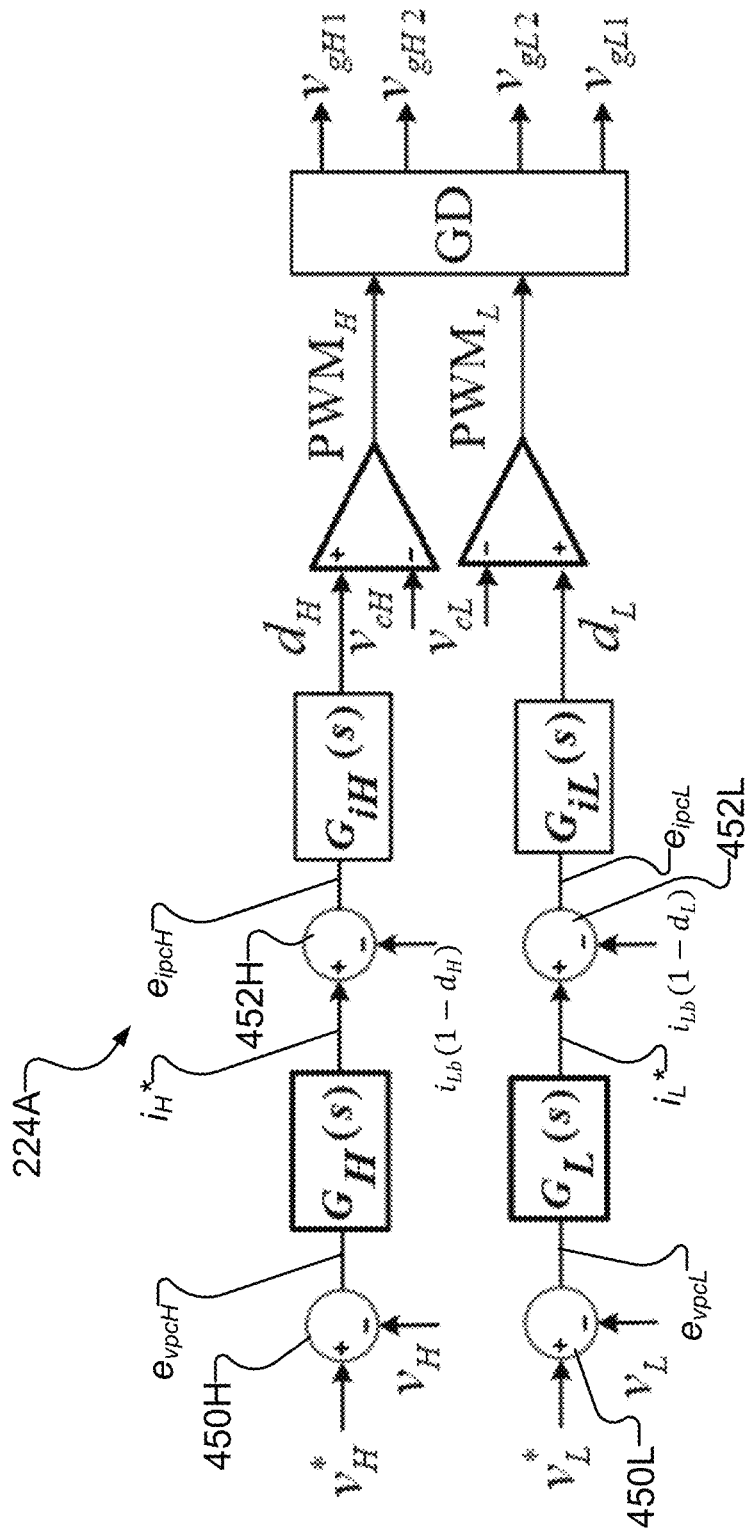
FIG. 5 is a schematic diagram of a control strategy for the capacitor pre-charge regulation of the FIG. 4A controller according to a particular embodiment.

FIG. 5 schematically illustrates a control strategy 224A for implementing the FIG. 4A input pre-charge methodology 224 according to one particular embodiment. As discussed above, set points $v_H^*$, $v_L^*$ which may be dynamically adjusted adaptive values that may be set at particular levels corresponding to the voltages $V_{dc1}$, $V_{dc2}$ output from input DC sources (e.g. PV arrays) 102A, 102B. Voltages $v_H$, $v_L$ (corresponding to the voltages across input capacitors $C_H$, $C_L$ just prior to the switching of input switches $K_{dc1}$, $K_{ddc2}$ to conducting states) may be measured by any suitable voltage sensors and/or voltage sensing circuits (not shown). These set points $v_H^*$, $v_L^*$ and measured voltages $v_H$, $v_L$ are fed to summing junctions 450H, 450L which output pre-charge voltage error signals $e_{vpcH}$, $e_{vpcL}$. Voltage error signals $e_{vpcH}$, $e_{vpcL}$ are processed by voltage regulators $G_H(s)$, $G_L(s)$ to obtain desired current signals $i_H^*$, $i_L^*$. Desired current signals $i_H^*$, $i_L^*$ are compared to actual measured currents $i_{Lb}(1-d_H)$, $i_{Lb}(1-d_L)$ (which represent the currents through inductor $L_b$ modulated by their respective duty cycles $(1-d_H)$, $(1-d_L)$) at summing junctions 452H, 452L to obtain pre-charge current error signals $e_{ipcH}$, $e_{ipcL}$. Current regulators $G_{iH}(s)$, $G_{iL}(s)$ process current error signals $e_{ipcH}$, $e_{ipcL}$ and output suitable duty cycle signals $d_H$, $d_L$ which will cause the voltages $v_H$, $v_L$ at input ports 208A, 208B to track toward set points $v_H^*$, $v_L^*$. The remainder of control strategy 224A (i.e. how duty cycle parameters $d_H$, $d_L$ are used to obtain gate voltages $v_{gH1}$, $V_{gH2}$, $V_{gL1}$, $v_{gL2}$) is similar to that described above for control strategy 222B of FIG. 1B.

For the single power source input of FIGS. 1B and 3B, the input initialization pre-charge control may be the same as the particular case where the set points $v_H^*$, $v_L^*$ are the same as one another and equal to $$v_H^* = v_L^* = \frac{V_{dc}}{2}.$$

Performance Validation

The inventors have run simulation experiments using design parameters from Table III to verify performance of the FIG. 1B architecture.

TABLE III

EXEMPLARY SYSTEM DESIGN PARAMETERS

| Description | Symbol | Value |
| --- | --- | --- |
| Capacitors (high and low side) | $C_H$, $C_L$ | 90 μF |
| Output DC filter capacitor | $C_b$ | 30 μF |
| Output DC filter inductance | $L_b$ | 100 μH |
| Switching frequency | $f_{sw}$ | 20 kHz |
| DC input operating voltage | $V_{dc1}$, $V_{dc2}$ | 2×(0-300 V) or 0-600 V |
| DC output voltage | $v_b$ | 0-100 V |
| Power transistors/diodes voltage rating | $T_{H1}/D_{H1}$, $T_{H2}/D_{H2}$, $T_{L1}/D_{L1}$, $T_{L2}/D_{L2}$ | >300 V (400 V typical) |

Figures 6A, 6B:
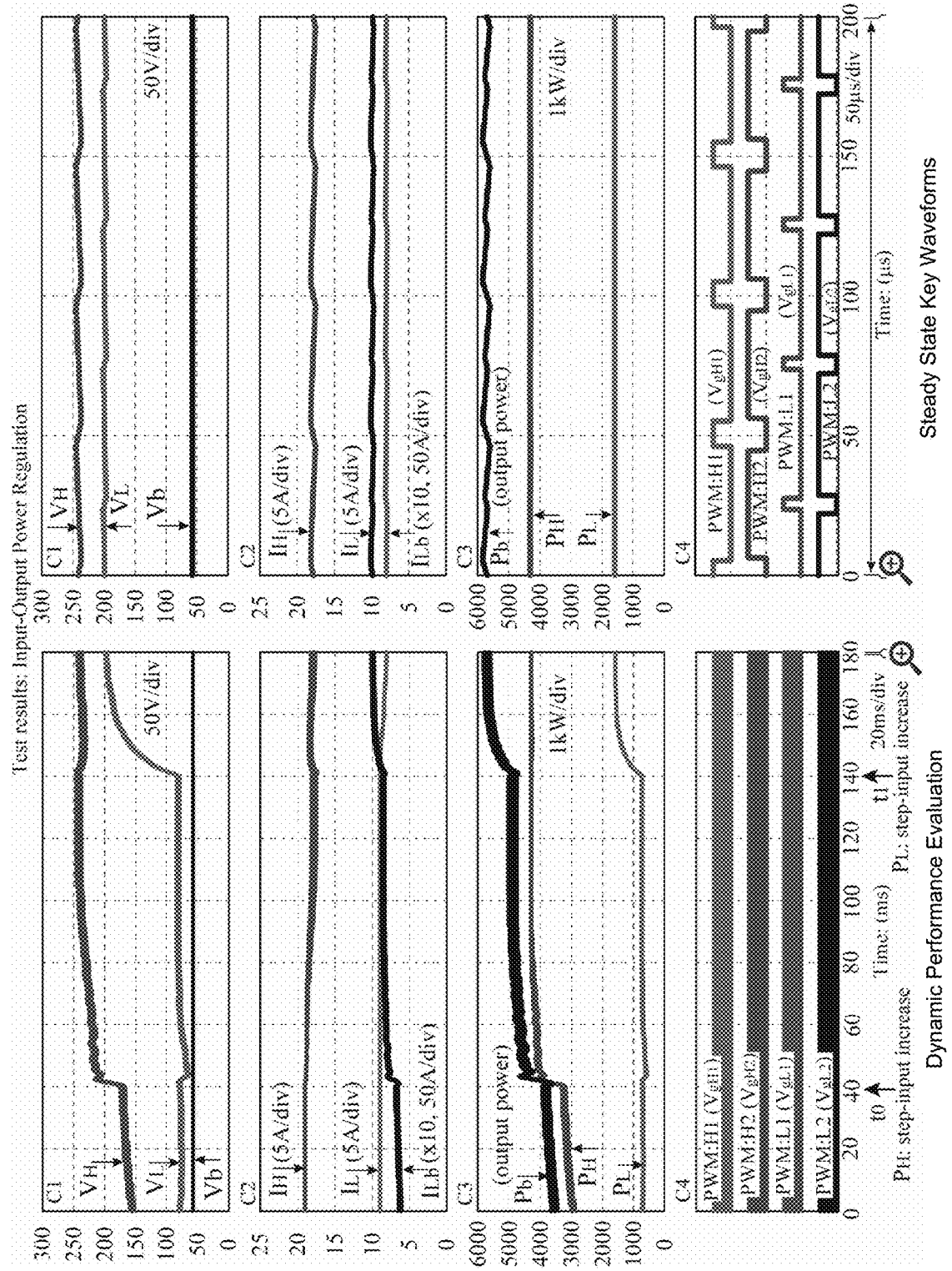
FIG. 6A is a diagram showing the dynamics of various parameters of the DC-DC converter of FIGS. 1B, 3A and/or 3B over a time scale on the order of 180 ms in response to an increase in input voltage $v_H$ which occurs at $t=t_0$ (e.g. which may be caused by increased solar irradiance on a particular PV array).
FIG. 6B shows the same parameters of the DC-DC converter of FIGS. 1B, 3A and/or 3B (without dramatic changes in input voltage) shown on a smaller time scale (i.e. over 200 µs).

FIGS. 6A and 6B (together FIG. 6) illustrate simulation of the FIG. 1B system under dynamic and steady state conditions. For the purpose of FIG. 6A, at $t_0$, there is a distinct ("quasi-step") increase in the input power $P_H$ of PV array (or other DC source (e.g. energy harvesting DC source)) 102A from about 3 kW to about 4 kW and controller 220 detects a power increase at port 208A and implements appropriate control strategy to increase the harvested power $P_b$. Also in FIG. 6A, at $t_1$, there is a distinct ("quasi-step") increase in the input power $P_L$ of PV array (or other DC source (e.g. energy harvesting DC source)) 102B from about 700 W to 1.6 kW and controller 220 detects a power increase at port 208A and implements appropriate control strategy. Each of FIGS. 6A and 6B show three plots. The plots of FIG. 6A show the dynamics of the various parameters of DC-DC converter 206 to the increases in DC source 102A, 102B input power over a time scale on the order of 180 ms). In contrast, the plots of FIG. 6B are steady state plots (without dramatic changes in the power of DC sources 102A, 102B) shown on a smaller time scale (i.e. over 200 μs). Plot C1 for both FIGS. 6A an 6B shows the input voltages $v_H=V_{dc1}$, $v_L=V_{dc2}$ and the output voltage $v_b$ (50V/div). Plot C2 for both FIGS. 6A an 6B shows the input DC currents $i_H$, $i_L$ and the output current $i_b$ (50A/div). Plot C3 for both FIGS. 6A an 6B shows the input power $P_H$ from power source 102A, $P_L$ from power source 102B and total output power $P_b$ (1 kW/div). Plot C4 for both FIGS. 6A an 6B shows the duty cycle control signals with pulse-width modulation (PWM) to switch pairs $T_{H1}$, $T_{H2}$ and $T_{L1}$, $T_{L2}$. Because of the time scale of the FIG. 6A plots, the PWM signals in plot C4 of FIG. 6A appears to be a thick solid line.

FIG. 6A shows an example of DC-DC converter's ability to maximize the power production from two independent and variable DC sources 102A, 102B and to provide output power regulation at EES 104. The available input power from DC sources 102A, 102B ($P_H$, $P_L$) does not have constant characteristics, which is similar to the variability of PV sources which vary with solar irradiance. FIGS. 6A and 6B illustrate how DC-DC converter 206 is able to maximize power production from these sources 102A, 102B with input voltage regulation (MPPT operation). The converter's control strategy operates in a stable fashion, despite the transient events occurring at t0 and t1. FIG. 6B shows details of the key waveforms using the control structure (buck mode) illustrated in FIG. 4B.

Figures 6C, 6D:
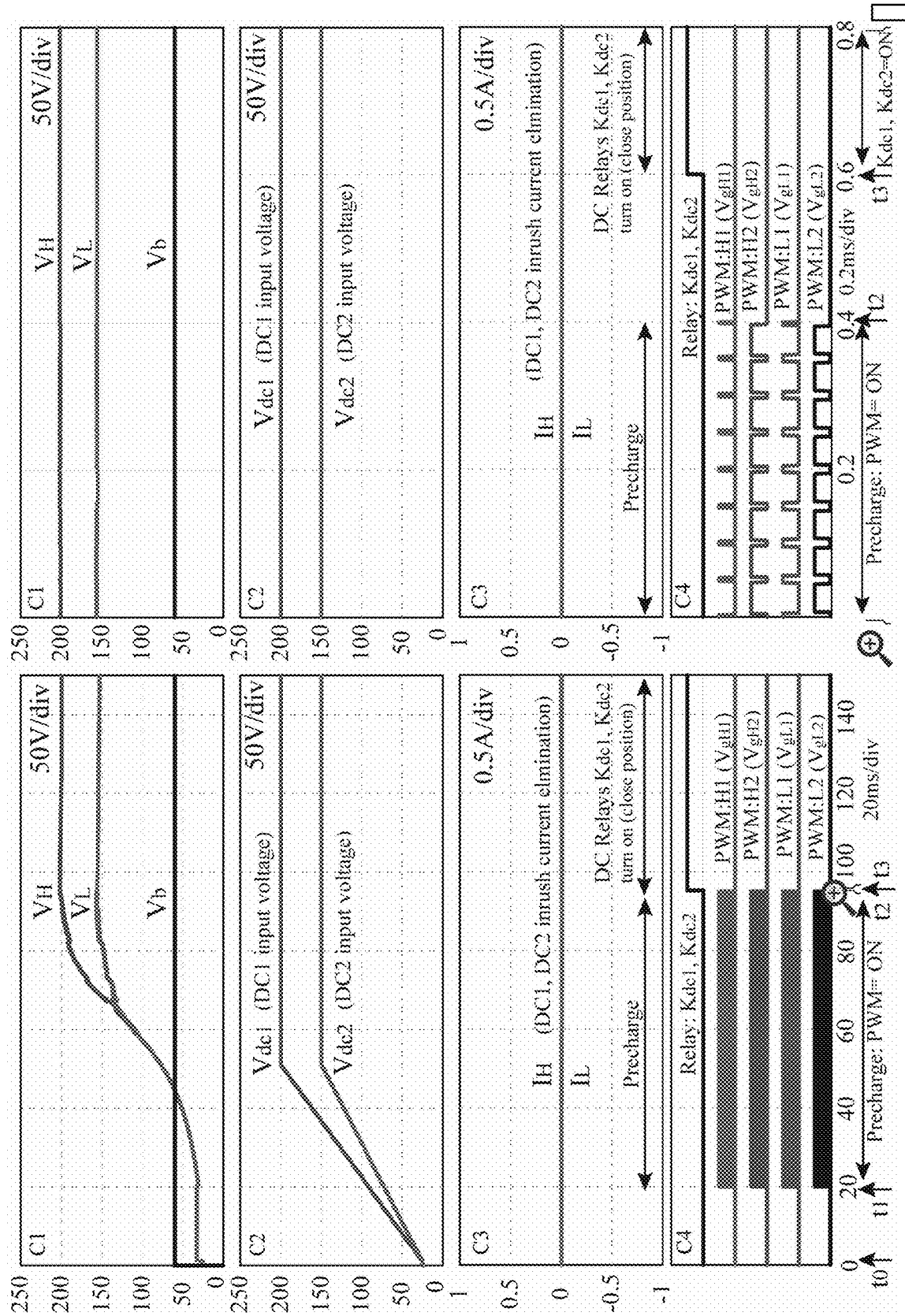
FIG. 6C illustrates the voltage control initialization with pre-charge regulation for the DC-DC converter of FIGS. 1B, 3A and/or 3B with dual input sources having input voltages $V_{dc1}$ and $V_{dc2}$ over a time period from 0-160 ms The case with single input source ($V_{dc}$) is a subset of the case for the dual input source, therefore the same control can be used.
FIG. 6D shows the same parameters as FIG. 6C over a time scale, highlighting the 0.8 ms time period between $t_2$, $t_3$.

FIG. 6C and 6D illustrate the voltage control initialization with pre-charge regulation for dual input sources 102A, 102B having input voltages $V_{dc1}$ and $V_{dc2}$. The case with single input source ($V_{dc}$) is a subset of the case for the dual input source, therefore the same control can be used. FIG. 6D differs from FIG. 6C, in that FIG. 6D shows a much smaller time scale, highlighting the 0.8 ms time period between $t_2$, $t_3$.

The undesirable inrush current, produced at the moment of switches $K_{dc1}$, $K_{dc2}$ switching from non-conducting states to conducting states, may be mitigated using the above-discussed control structure from FIG. 5. The magnitude of the inrush current is function of the source impedance with its current capability and the capacitance values of input capacitors $C_H$, $C_L$. Referring to FIG. 6C, at the moment $t_0$, the input voltages $V_{dc1}$, $V_{dc2}$ start to increase and, therefore, there is an opportunity for power production. At $t_1$, the pre-charge boost mode is activated and the switch pairs $T_{H1}$, $T_{H2}$ and $T_{L1}$, $T_{L2}$ may be controlled in accordance with the FIG. 5 control structure. At $t_2$, the capacitors $C_H$, $C_L$ are charged with a voltage magnitude corresponding to voltages $v_H=V_{dc1}$, $v_L=V_{dc2}$, and then the PWM of switch pairs $T_{H1}$, $T_{H2}$ and $T_{L1}$, $T_{L2}$ is discontinued, since the voltage targets have been achieved. Therefore, at $t_3$, the dc input switches $K_{dc1}$, $K_{dc2}$ are switched from their non-conducting states to conducting states, thereby connecting the input sources 102A ($V_{dc1}$), 102B ($V_{dc2}$) to DC-DC converter 206. When $v_H \approx V_{dc1}$ and $v_L \approx V_{dc2}$, the inrush current is mitigated (e.g. reduced to near zero). Now, converter 206 is ready to start power production from input ports 208A, 208B to output port 210.

In summary, FIGS. 6A, 6B demonstrate that the FIG. 1B system 200 with the input-output power control strategy 222B (of FIG. 4B) performs well from steady state to dynamic conditions. System 200 operates over a wide DC range for improved power production and utilization. FIGS. 6C and 6D show control over pre-charging capacitors CH, CL to mitigate inrush current in accordance with the control strategy of FIG. 5.

Figure 7:
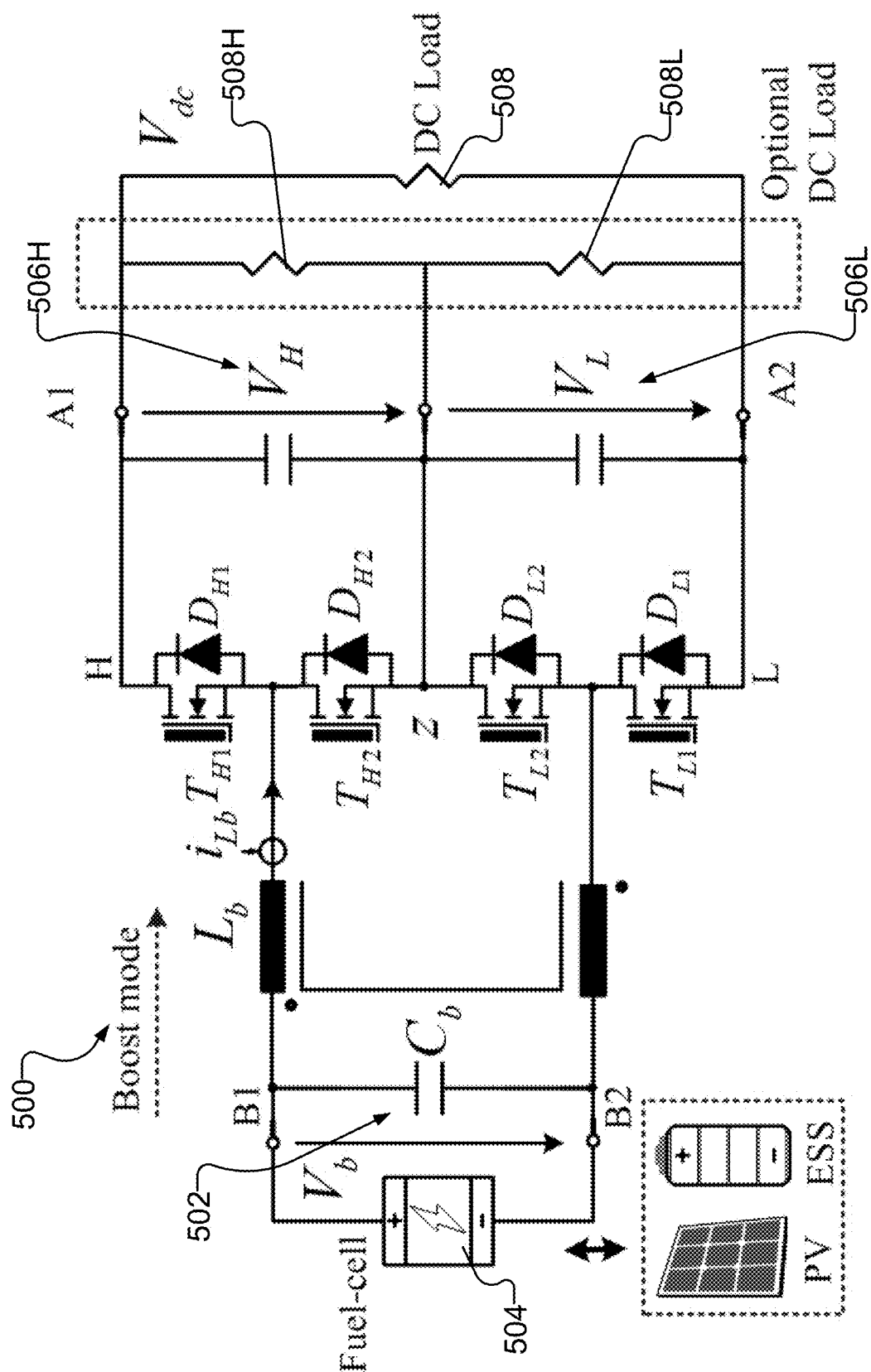
FIG. 7 is a schematic circuit diagram of a DC-DC converter having its input and output ports reversed relative to the DC-DC converters of FIGS. 1B, 3A and/or 3B according to a particular embodiment.

FIG. 7 shows a power conversion system 500 where the input-out ports are reversed (as compared to the FIG. 1B embodiment) to operate in boost mode. For example, at input port 502 defined by nodes B1, B2, energy harvesting DC sources (e.g. fuel-cells, PV arrays, electric machines and/or EES systems) 504 are connected at the lower voltage $V_b$ port 502. At the output port 506 defined by nodes A1, A2, higher voltage DC loads 508 can be connected, with optional available dual dc loads 508H (at port 506H between node A1 and common node Z) and 508L (at port 506L between node A2 and common node Z). The output voltages $V_H$, $V_L$ can be independently controlled, with equal ($V_H=V_L$; $i_H=i_L$) or different ($V_H \neq V_L$; $i_H \neq i_L$) voltage/current magnitude. The boost mode from the FIG. 7 implementation can use the same control strategy of the boost pre-charge mode (FIG. 5), with similar results per tests results of FIG. 6C and FIG. 6D.

As discussed above, DC-DC conversion systems according to various embodiments may comprise controllers 220 which may themselves comprise suitable processors. Certain implementations of the invention comprise one or more processors which execute software instructions which cause the processors to perform a method of the invention. For example, one or more processors may implement data processing steps in the methods described herein by executing software instructions retrieved from a program memory accessible to the processors. Embodiments of the invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical (non-transitory) media such as magnetic data storage media including floppy diskettes, hard disk drives, optical data storage media including CD ROMs, DVDs, electronic data storage media including ROMs, flash RAM, or the like. The instructions may be present on the program product in encrypted and/or compressed formats.

Where a component (e.g. a software module, controller, processor, assembly, device, component, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. For example:

The power devices in the FIG. 1B, 3A, 3B converter 206 (e.g. semiconductor components $T_{H1}/D_{H1}$, $T_{H2}/D_{H2}$, $T_{L1}/D_{L1}$, $T_{L2}/D_{L2}$ and capacitors $C_H$, $C_L$) can be rated at approximately half of DC input voltage $V_{dc}$.

A number of the embodiments of DC-DC converters and corresponding operational methods disclosed herein are shown with input ports connected to PV arrays. This is not necessary. The input ports of the DC-DC converters described herein could be connected to any DC power sources. Non-limiting examples include other energy harvesting from variable energy sources such as wind turbines, fuel cells and/or the like.

A number of the embodiments of DC-DC converters and corresponding operational methods disclosed herein are shown with output ports connected to EES. This is not necessary. In general, the output ports of the DC-DC converters described herein could be connected to any suitable DC loads.

Some of the components of the DC-DC converters described herein (e.g. the components subscripted by the letter "H", such as, by way of non-limiting example, $C_H$, $T_{H1}$, $T_{H2}$, $D_H$, $D_{H2}$) may be referred to herein as "upper" components and some of the components of the DC-DC converters described herein (e.g. the components subscripted by the letter "L", such as, by way of non-limiting example, $C_L$, $T_{L1}$, $T_{L2}$, $D_{L1}$, $D_{L2}$) may be referred to herein as "lower" components. This is a convenient way to describe these components because of the layout of the drawings that form part of this disclosure. In this context, the words "upper" and "lower" are not meant to provide any physical or spatial meaning and are used primarily for convenient naming convention.

In the illustrated embodiment, inductor $L_b$ is provided as an integrated winding-coupled inductor. It is possible, in some embodiments, the inductor $L_b$ could be provided as a pair of separate conductors in series with the nodes (e.g. nodes B1, B2) of the output port (e.g. output port 210).

It is therefore intended that the following appended claims and claims hereafter introduced are interpreted to include all such modifications, permutations, additions and sub-combinations as are consistent with the broadest interpretation of the specification as a whole.

The invention claimed is:

1. A DC-DC power converter comprising:
   first, second and third input nodes for connection to one or more DC input power sources;
   a pair of upper switches $T_{H1}$, $T_{H2}$ connected in series between the first and second input nodes;
   a pair of lower switches $T_{L1}$, $T_{L2}$ connected in series between the second and third input nodes;
   an output port connected, via one or more output capacitors and one or more output inductors, to an upper switching node between the pair of upper switches $T_{H1}$, $T_{H2}$ and a lower switching node between the pair of lower switches $T_{L1}$, $T_{L2}$;
   wherein the DC-DC converter is connectable to a pair of DC input power sources, with a first DC input power source connected between the first and second input nodes and a second DC input power source connected between the second and third input nodes, and, when so connected, the pair of upper switches $T_{H1}$, $T_{H2}$ and the pair of lower switches $T_{L1}$, $T_{L2}$ are switchable to provide DC output power at the output port; and
   wherein the DC-DC converter is connectable to one DC input power source connected between the first and third input nodes, and, when so connected, the pair of upper switches $T_{H1}$, $T_{H2}$ and the pair of lower switches $T_{L1}$, $T_{L2}$ are switchable to provide DC output power at the output port.

2. A DC-DC power converter according to claim 1 comprising an upper input capacitor $C_H$ connected in parallel with the pair of upper switches $T_{H1}$, $T_{H2}$ between the first and second input nodes and a lower input capacitor $C_L$ connected in parallel with the pair of lower switches $T_{L1}$, $T_{L2}$ between and second and third input nodes.

3. A DC-DC power converter according to claim 1 wherein:
   the output port comprises an upper output node and a lower output node; and
   the one or more output inductors comprise a winding-coupled inductor which provides inductance in series between the upper switching node and the upper output node and in series between the lower switching node and the lower output node.

4. A DC-DC power converter according to claim 3 wherein the one or more output capacitors comprise an output capacitor $C_b$ connected between the upper and lower output nodes.

5. A DC-DC power converter according to claim 1 wherein the output port is connectable to a load comprising an electrical energy storage (EES) system to thereby provide the DC output power to the electrical energy storage system.

6. A DC-DC power converter according to claim 5 wherein the electrical energy storage system has a voltage set point $V_b^*$ suitable for providing electrical energy to the energy storage system and wherein the DC-DC converter is connectable to the pair of DC input power sources to provide DC output power having an output voltage at the voltage set point $V_b^*$ at the output port under a condition that $V_{dc1}+V_{dc2} \geq V_b^*$, where $V_{dc1}$ is a voltage of the first DC input power source and $V_{dc2}$ is a voltage of the second DC input power source.

7. A DC-DC power converter according to claim 5 wherein the electrical energy storage system has a voltage set point $V_b^*$ suitable for providing electrical energy to the energy storage system and wherein the DC-DC converter is connectable to the one DC input power source to provide DC output power having an output voltage at the voltage set point $V_b^*$ at the output port under a condition that $V_{dc} \geq V_b^*$, where $V_{dc}$ is a voltage of the one DC input power source.

8. A DC-DC power converter according to claim 1 wherein the first and second DC input power sources are independent of one another.

9. A DC-DC power converter according to claim 1 wherein the first and second DC input power sources comprise variable power sources having power that varies over time.

10. A DC-DC power converter according to claim 9 wherein the first and second DC input power sources each comprise one or more photovoltaic cells.

11. A DC-DC power converter according to claim 9 wherein the first and second DC input power sources each comprise one or more wind turbines or fuel cells.

12. A DC-DC power converter according to claim 1 comprising a controller configured to switch the pair of upper switches $T_{H1}$, $T_{H2}$ and the pair of lower switches $T_{L1}$, $T_{L2}$ according to a pulse-width modulation scheme wherein:
the upper pair of switches $T_{H1}$, $T_{H2}$ have an upper duty cycle $d_H$ that is a period of time ($t_{onH}$) during which the upper switch $T_{H1}$ is conducting during a switching period $T_s$ and the upper switch $T_{H2}$ is conducting whenever the upper switch $T_{H1}$ is not conducting; and
the lower pair of switches $T_{L1}$, $T_{L2}$ have a lower duty cycle $d_L$ that is a period of time ($t_{onL}$) during which the lower switch $T_{L1}$ is conducting during the switching period $T_s$ and the lower switch $T_{L2}$ is conducting whenever the lower switch $T_{L1}$ is not conducting.

13. A DC-DC power converter according to claim 12 wherein:
the output port is connectable to a load comprising an electrical energy storage (EES) system to thereby provide the DC output power to the electrical energy storage system;
the electrical energy storage system has an output voltage set point $V_b^*$ suitable for providing electrical energy to the energy storage system and wherein the DC-DC converter is connectable to the pair of DC input power sources to provide DC output power having an output voltage at the output voltage set point $V_b^*$ at the output port under a condition that $V_{dc1}+V_{dc2} \geq V_b^*$, where $V_{dc1}$ is a voltage of the first DC input power source and $V_{dc2}$ is a voltage of the second DC input power source; and
the controller is configured to switch the pair of upper switches $T_{H1}$, $T_{H2}$ and the pair of lower switches $T_{L1}$, $T_{L2}$ with upper and lower duty cycles $d_H$, $d_L$ that satisfy a relation $$d_H + d_L \cong \frac{V_b^*}{V_{dc1}+V_{dc2}}.$$

14. A system according to claim 13 comprising:
an upper input switch $K_{dc1}$ connected in series between the first input node and the pair of upper switches $T_{H1}$, $T_{H2}$ and a lower input switch $K_{dc2}$ connected in series between the third input node and the pair of lower switches $T_{L1}$, $T_{L2}$;
an upper input capacitor $C_H$, having an upper voltage level $v_H$, connected in parallel with the pair of upper switches $T_{H1}$, $T_{H2}$ between the first and second input nodes and a lower input capacitor $C_L$, having a lower voltage level $v_L$, connected in parallel with the pair of lower switches $T_{L1}$, $T_{L2}$ between and second and third input nodes; and
the controller connected to control switching states of the upper input switch $K_{dc1}$ and the lower input switch $K_{dc2}$;
wherein the controller is configured to determine that the output voltage set point $V_b^*$ cannot be attained and switches to an input power regulation control mode to achieve maximum power production at a particular electrical energy storage (EES) system connected to the output port and wherein, according to the input power regulation control mode, the controller regulates the input voltages $V_{dc1}$ and $V_{dc2}$ to $V_{dc1}=v_H \approx v_{mppH}^*$ and $V_{dc2}=v_L \approx v_{mppL}^*$, where $v_{mppH}^*$, $v_{mppL}^*$ are reference voltages determined by a MPPT algorithm to maximize energy harvesting for the particular electrical energy storage (EES) system.

15. A DC-DC power converter according to claim 1 comprising a controller configured to switch the pair of upper switches $T_{H1}$, $T_{H2}$ and the pair of lower switches $T_{L1}$, $T_{L2}$ according to a pulse-width modulation scheme wherein:
the upper pair of switches $T_{H1}$, $T_{H2}$ have an upper duty cycle $d_H$ that is a period of time ($t_{onH}$) during which the upper switch $T_{H1}$ is conducting during a switching period $T_s$ and the upper switch $T_{H2}$ is conducting whenever the upper switch $T_{H1}$ is not conducting; and
the lower pair of switches $T_{L1}$, $T_{L2}$ have a lower duty cycle $d_L$ that is a period of time ($t_{onL}$) during which the lower switch $T_{L1}$ is conducting during the switching period $T_s$ and the lower switch $T_{L2}$ is conducting whenever the lower switch $T_{L1}$ is not conducting;
with a common duty cycle $d_{HL}$, wherein $$d_H \cong d_L \cong \frac{d_{HL}}{2}$$

and wherein:
for $d_{HL}<50\%$, $d_{HL}$ is a period of time during which the pair of upper switches $T_{H1}$, $T_{H2}$ is conducting during the switching period $T_s$ and the pair of lower switches $T_{L1}$, $T_{L2}$ is conducting whenever the pair of upper switches $T_{H1}$, $T_{H2}$ is not conducting; and
for $d_{HL}>50\%$, $d_{HL}$ is a period of time during which the pair of upper switches $T_{H1}$, $T_{H2}$ is conducting during the switching period $T_s$ and the pair of lower switches $T_{L1}$, $T_{L2}$ and upper switches $T_{H1}$, $T_{H2}$ may simultaneously conduct.

16. A DC-DC power converter according to claim 15 wherein:

the output port is connectable to a load comprising an electrical energy storage (EES) system to thereby provide the DC output power to the electrical energy storage system;

the electrical energy storage system has an output voltage set point $V_b^*$ suitable for providing electrical energy to the energy storage system and wherein the DC-DC converter is connectable to the one DC input power source to provide DC output power having an output voltage at the output voltage set point $V_b^*$ at the output port under a condition that $V_{dc} \geq V_b^*$, where $V_{dc}$ is a voltage of the one DC input power source; and the controller is configured to switch the pair of upper switches $T_{H1}$, $T_{H2}$ and the pair of lower switches $T_{L1}$, $T_{L2}$ to satisfy a relation $$\begin{cases} d_{HL} = d_H + d_L \\ V_b^* = d_H V_H + d_L V_L \end{cases}.$$

17. A system according to claim 16 comprising:

an upper input switch $K_{dc1}$ connected in series between the first input node and the pair of upper switches $T_{H1}$, $T_{H2}$ and a lower input switch $K_{dc2}$ connected in series between the third input node and the pair of lower switches $T_{L1}$, $T_{L2}$;

an upper input capacitor $C_H$, having an upper voltage level $v_H$, connected in parallel with the pair of upper switches $T_{H1}$, $T_{H2}$ between the first and second input nodes and a lower input capacitor $C_L$, having a lower voltage level $v_L$, connected in parallel with the pair of lower switches $T_{L1}$, $T_{L2}$ between and second and third input nodes; and the controller connected to control switching states of the upper input switch $K_{dc1}$ and the lower input switch $K_{dc2}$;

wherein the controller is configured to determine that the output voltage set point $V_b^*$ cannot be attained and switches to an input power regulation control mode to achieve maximum power production at a particular electrical energy storage (EES) system connected to the output port and wherein, according to the input power regulation control mode, the controller regulates the input voltage $V_{dc}$ to $V_{dc} = v_H + v_L \approx v_{mpp}^*$, where $v_H = v_L$ and $v_{mpp}^*$ is a reference voltage determined by a MPPT algorithm to maximize energy harvesting for the particular electrical energy storage (EES) system.

18. A DC-DC power converter according to claim 1 wherein an input voltage between the first and third input nodes sums to be within a range of 30V-600V DC.

19. A DC-DC power converter according to claim 1 wherein an input voltage between the first and third input nodes sums to be within a range of 100V-1500V DC.

20. A DC-DC power converter according to claim 1 comprising:

an upper input switch $K_{dc1}$ connected in series between the first input node and the pair of upper switches $T_{H1}$, $T_{H2}$ and a lower input switch $K_{dc2}$ connected in series between the third input node and the pair of lower switches $T_{L1}$, $T_{L2}$;

an upper input capacitor $C_H$ connected in parallel with the pair of upper switches $T_{H1}$, $T_{H2}$ between the first and second input nodes and a lower input capacitor $C_L$ connected in parallel with the pair of lower switches $T_{L1}$, $T_{L2}$ between and second and third input nodes; and a controller connected to control switching states of the upper input switch $K_{dc1}$ and the lower input switch $K_{dc2}$.

21. A DC-DC power converter according to claim 20 wherein the output port is connectable to a load comprising an electrical energy storage (EES) system to thereby provide the DC output power to the electrical energy storage system and the controller is configured to operate the DC-DC power converter in a pre-charge boost mode by:

controlling the switching states of the upper input switch $K_{dc1}$ and the lower input switch $K_{dc2}$ to be non-conducting; and controlling the switch pairs $T_{H1}$, $T_{H2}$ and $T_{L1}$, $T_{L2}$ in the pre-charge boost mode wherein:

the electrical energy storage system pre-charges the upper input capacitor $C_H$ to an upper voltage level $v_H$ that is within a threshold region around a voltage $V_{dc1}$ of a first DC input power source connectable between the first and second input nodes; and the electrical energy storage system pre-charges the lower input capacitor $C_L$ to a lower voltage level $v_L$ that is within a threshold region around a voltage $V_{dc2}$ of a second DC input power source connectable between the second and third input nodes.

22. A system according to claim 21 wherein the upper voltage level $v_H$ and the lower voltage level $v_L$ are independent from and different than one another.

23. A DC-DC power converter system comprising:

first, second and third input nodes for connection to one or more DC input power sources;

a pair of upper switches $T_{H1}$, $T_{H2}$ connected in series between the first and second input nodes;

a pair of lower switches $T_{L1}$, $T_{L2}$ connected in series between the second and third input nodes;

an output port connected, via one or more output capacitors and one or more output inductors, to an upper switching node between the pair of upper switches $T_{H1}$, $T_{H2}$ and a lower switching node between the pair of lower switches $T_{L1}$, $T_{L2}$;

a pair of DC input power sources, with a first DC input power source connected between the first and second input nodes and a second DC input power source connected between the second and third input nodes, the pair of upper switches $T_{H1}$, $T_{H2}$ and the pair of lower switches $T_{L1}$, $T_{L2}$ switchable to provide DC output power at the output port; and the output port is connected to a load comprising an electrical energy storage (EES) system to thereby provide the DC output power to the electrical energy storage system.

24. A DC-DC power converter system according to claim 23 wherein the electrical energy storage system has a voltage set point $V_b^*$ suitable for providing electrical energy to the energy storage system and wherein the DC output power at the output port has an output voltage at the voltage set point $V_b^*$ under the condition that $V_{dc1} + V_{dc2} \geq V_b^*$, where $V_{dc1}$ is the voltage of the first DC input power source and $V_{dc2}$ is the voltage of the second DC input power source.

25. A method for DC-DC power conversion over a wide input voltage utilization range, the method comprising:

providing a DC-DC power conversion circuit, the DC-DC power conversion circuit comprising:

first, second and third input nodes for connection to one or more DC input power sources;

a pair of upper switches $T_{H1}$, $T_{H2}$ connected in series between the first and second input nodes;

a pair of lower switches $T_{L1}$, $T_{L2}$ connected in series between the second and third input nodes;

an output port connected, via one or more output capacitors and one or more output inductors, to an upper switching node between the pair of upper switches $T_{H1}$, $T_{H2}$ and a lower switching node between the pair of lower switches $T_{L1}$, $T_{L2}$;

connecting the DC-DC power conversion circuit to a pair of DC input power sources, with a first DC input power source connected between the first and second input nodes and a second DC input power source connected between the second and third input nodes;

connecting the output port to a load comprising an electrical energy storage (EES) system;

switching the pair of upper switches $T_{H1}$, $T_{H2}$ and the pair of lower switches $T_{L1}$, $T_{L2}$ to provide DC output power to the electrical energy storage system;

wherein the electrical energy storage system has a voltage set point $V_b^*$ suitable for providing electrical energy to the energy storage system and wherein switching the pair of upper switches $T_{H1}$, $T_{H2}$ and the pair of lower switches $T_{L1}$, $T_{L2}$ to provide DC output power to the electrical energy storage system comprises providing the DC output power having an output voltage at the voltage set point $V_b^*$ at the output port under the condition that $V_{dc1}+V_{dc2} \geq V_b^*$, where $V_{dc1}$ is the voltage of the first DC input power source and $V_{dc2}$ is the voltage of the second DC input power source.

\* \* \* \* \*